US009253469B2

United States Patent
Suh et al.

(10) Patent No.: US 9,253,469 B2
(45) Date of Patent: *Feb. 2, 2016

(54) METHOD FOR DISPLAYING 3D CAPTION AND 3D DISPLAY APPARATUS FOR IMPLEMENTING THE SAME

(71) Applicant: LG ELECTRONICS INC., Seoul (KR)

(72) Inventors: Jong-Yeul Suh, Seoul (KR); Jeong-Hyu Yang, Seoul (KR); Jin-Pil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.
This patent is subject to a terminal disclaimer.

(21) Appl. No.: 14/494,835

(22) Filed: Sep. 24, 2014

(65) Prior Publication Data

US 2015/0009305 A1    Jan. 8, 2015

Related U.S. Application Data

(63) Continuation of application No. 14/074,470, filed on Nov. 7, 2013, now Pat. No. 8,878,899, which is a continuation of application No. 13/059,583, filed as application No. PCT/KR2009/005435 on Sep. 23, (Continued)

(51) Int. Cl.
*H04N 13/00*    (2006.01)
*H04N 5/445*    (2011.01)
(Continued)

(52) U.S. Cl.
CPC ......... *H04N 13/007* (2013.01); *H04N 5/44513* (2013.01); *H04N 13/0048* (2013.01);
(Continued)

(58) Field of Classification Search
CPC ............ H04N 13/0066; H04N 13/007; H04N 21/235; H04N 21/2362; H04N 21/4345; H04N 21/4884; H04N 19/597; H04N 13/0048; H04N 5/44513; H04N 13/04; H04N 21/435

USPC ............ 348/42, 43, 46, 51, 54, 465, 467, 468
See application file for complete search history.

(56) References Cited

U.S. PATENT DOCUMENTS 6,351,280 B1    2/2002  Benton
2009/0142041 A1*    6/2009  Nagasawa et al. ............ 386/124
(Continued)

FOREIGN PATENT DOCUMENTS

CA    2680724    9/2008
CN    1717013 A    1/2006
(Continued)

OTHER PUBLICATIONS

"FCC Rules Concerning Closed Caption Decoders for Digital Television". Jan. 8, 2001, pp. 1-13. http://www.fcc.gov/oet/info/rules/part15/part15_jan8_01.doc.*
(Continued)

*Primary Examiner* — Christopher S Kelley
*Assistant Examiner* — Zhihan Zhou
(74) *Attorney, Agent, or Firm* — Dentons US LLP

(57) ABSTRACT

A 3D caption display method for harmoniously merging and displaying closed caption with 3D image in a 3D display apparatus, and a 3D display apparatus suitable for implementing the method. When the 3D display apparatus receives image signals of first and second images for implementing 3D image in a stereoscopic scheme, the 3D display apparatus receives closed caption data only for a base view determined from the first and second images. Then, the display apparatus determines the position of a closed caption for an extended view based on the closed caption data for the base view and a certain 3D caption information, and formats caption graphic data for the base view and the extended view to output 3D closed caption in a stereoscopic format.

18 Claims, 29 Drawing Sheets

Related U.S. Application Data 2009, now Pat. No. 8,599,242.

(60) Provisional application No. 61/120,483, filed on Dec. 7, 2008, provisional application No. 61/119,337, filed on Dec. 2, 2008.

(51) Int. Cl.

| | | |
|---|---|---|
| *H04N 13/04* | (2006.01) | |
| *H04N 21/235* | (2011.01) | |
| *H04N 21/2362* | (2011.01) | |
| *H04N 21/434* | (2011.01) | |
| *H04N 21/435* | (2011.01) | |
| *H04N 21/488* | (2011.01) | |
| *H04N 19/597* | (2014.01) | |

(52) U.S. Cl.
CPC ........... *H04N13/0066* (2013.01); *H04N 13/04* (2013.01); *H04N 19/597* (2014.11); *H04N 21/235* (2013.01); *H04N 21/2362* (2013.01); *H04N 21/435* (2013.01); *H04N 21/4345* (2013.01); *H04N 21/4884* (2013.01); *H04N 2005/44526* (2013.01)

(56) References Cited

U.S. PATENT DOCUMENTS

| | | | |
|---|---|---|---|
| 2009/0315979 A1* | 12/2009 | Jung et al. | 348/43 |
| 2010/0021141 A1 | 1/2010 | Yamashita et al. | |
| 2010/0074594 A1 | 3/2010 | Nakamura et al. | |
| 2010/0238267 A1* | 9/2010 | Izzat et al. | 348/43 |

FOREIGN PATENT DOCUMENTS

| | | |
|---|---|---|
| CN | 1741583 A | 3/2006 |
| CN | 1960451 A | 5/2007 |
| CN | 101312506 A | 11/2008 |
| JP | 2004-274125 | 9/2004 |
| JP | 2008-515048 A | 5/2008 |
| KR | 10-2003-0019559 A | 3/2003 |
| WO | 2006/036290 A1 | 4/2006 |
| WO | 2007/064159 A1 | 6/2007 |
| WO | 2007-064159 A1 | 6/2007 |
| WO | 2008115222 A1 | 9/2008 |
| WO | 2010/085074 A2 | 7/2010 |
| WO | 2010/093115 A2 | 8/2010 |

OTHER PUBLICATIONS

"PixelTools: Tech Tips—Closed Captioning". 1998-2012 PixelTools Corporation. Accessed on Nov. 29, 2007. http://web.archive.org/web/20071129232319/http://www.pixeltools.com/tech_tip_closed_captioning.html.*

Gregory Forbes, "Closed Captioning Transmission and Display in Digital Television", Feb. 8, 2001, Public Broadcasting Service, Alexandria, VA 22314, 2001 IEEE, pp. 126-131.

Senda, JP2004274125 Translated Abstract and Full Text. Sep. 2004.

* cited by examiner

-Prior Art-

FIG. 2

-Prior Art-

| Syntax | No. of bits | Format |
|---|---|---|
| cc_data ( ) { | | |
|     reserved | 1 | '1' |
|     process_cc_data_flag | 1 | bslbf |
|     zero_bit | 1 | '0' |
|     cc_count | 5 | uimsbf |
|     reserved | 8 | '1111 1111' |
|     for (i=0; i < cc_count; i++) { | | |
|         one_bit | 1 | '1' |
|         reserved | 4 | '1111' |
|         cc_valid | 1 | bslbf |
|         cc_type | 2 | bslbf |
|         cc_data_1 | 8 | bslbf |
|         cc_data_2 | 8 | bslbf |
|     } | | |
| } | | |

FIG. 3

-Prior Art-

| b7 | b6 | b5 | b4 | b3 | b2 | b1 | b0 |
|---|---|---|---|---|---|---|---|
| SEQ. NO. | | colspan | | PACKET SIZE | | | |

| b7 b6 | b5 b4 b3 b2 b1 b0 |
|---|---|
| SEQ. NO. | PACKET SIZE |
| CAPTION CHANNEL DATA (byte 1) | |
| CAPTION CHANNEL DATA (byte 2) | |
| ⋮ | |
| CAPTION CHANNEL DATA (byte n-1) | |

-Prior Art-

FIG. 5

-Prior Art-

| b7-b4 | CL | | GL | | | | | | CR | | GR | | | | | |
|---|---|---|---|---|---|---|---|---|---|---|---|---|---|---|---|---|
| b3-b0 | 0 | 1 | 2 | 3 | 4 | 5 | 6 | 7 | 8 | 9 | A | B | C | D | E | F |
| 0 | | | | | | | | | | | | | | | | |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | C0 | | G0 | | | | | | C1 | | G1 | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | |
| 0 | | | | | | | | | | | | | | | | |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | C2 | | G2 | | | | | | C3 | | G3 | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | |

FIG. 7

| Syntax | No. of bits | Format |
|---|---|---|
| extension_and_user_data (2) { | | |
|     while ((nextbits() == extension_start_code) \|\| | | |
|     (nextbits() == user_data_start_code)) { | | |
|         if (nextbits() == extension_data_start_code) | | |
|             extension_data(2) | | |
|         if (nextbits() == user_data_start_code) | | |
|             user_data( ) | | |
|     } | | |
| } | | |

| Syntax | No. of bits | Format |
|---|---|---|
| user_data( ) { | | |
|     user_data_start_code | 32 | bslbf |
|     user_data_identifier | 32 | bslbf |
|     user_structure() | | |
| } | | | user_data_start_code = '0x0000 01B2'
user_data_identifier = '0x4741 3934'

| Syntax | No. of bits | Format |
|---|---|---|
| ATSC_user_data( ) { | | |
|     user_data_type_code | 8 | uimsbf |
|     user_data_type_structure() | | |
| } | | | user_data_type_code = '0x03'

| Syntax | No. of bits | Format |
|---|---|---|
| MPEG_cc_data ( ) { | | |
|     cc_data ( ) | | |
|     marker_bits | 8 | '1111 1111' |
| } | | |

FIG. 8

| Syntax | No. of bits | Format |
|---|---|---|
| cc_data ( ) { | | |
|     reserved | 1 | '1' |
|     process_cc_data_flag | 1 | bslbf |
|     zero_bit | 1 | '0' |
|     cc_count | 5 | uimsbf |
|     reserved | 8 | '1111 1111' |
|     for (i=0; i < cc_count; i++) { | | |
|         one_bit | 1 | '1' |
|         reserved | 4 | '1111' |
|         cc_valid | 1 | bslbf |
|         cc_type | 2 | bslbf |
|         cc_data_1 | 8 | bslbf |
|         cc_data_2 | 8 | bslbf |
|     } | | |
| } | | |

FIG. 9

| Syntax | No. of bits | Format |
|---|---|---|
| user_data_registered_itu_t_t35( ) { | | |
|     itu_t_t35_country_code | 8 | bslbf |
|     itu_t_t35_provider_code | 16 | bslbf |
|     user_identifier | 32 | bslbf |
|     user_structure( ) | | |
| } | | |

FIG. 10

| Syntax | No. of bits | Format |
|---|---|---|
| caption_service_descriptor ( ) { | | |
|     descriptor_tag | 8 | 0x86 |
|     descriptor_length | 8 | uimsbf |
|     reserved | 3 | '111' |
|     number_of_services | 5 | uimsbf |
|     for (I=0; i<number_of_services; i++) { | | |
|         language | 8*3 | uimsbf |
|         digital_cc | 1 | bslbf |
|         reserved | 1 | '1' |
|         if (digital_cc == line21) { | | |
|             reserved | 5 | '11111' |
|             line21_field | 1 | bslbf |
|         } | | |
|         else | | |
|             caption_service_number | 6 | uimsbf |
|             easy_reader | 1 | bslbf |
|             wide_aspect_ratio | 1 | bslbf |
|     cc_3d_type | 2 | bslbf |
|     if( cc_3d_type != '00' ) { | | |
|         base_view | 1 | bslbf |
|         if( cc_3d_type != '11' ) { | | |
|             cc_disparity | 11 | uimsbf |
|         else | | |
|             cc_depth | 11 | uimsbf |
|     } | | |
|     else | | |
|         reserved | 12 | '111111 111111' |
|     } | | |
| } | | |

SHIFT BY DISPARITY

FIG. 25

| Syntax | No. of bits | Format |
|---|---|---|
| user_data( ) { | | |
|     user_data_start_code | 32 | bslbf |
|     user_data_identifier | 32 | bslbf |
|     user_structure() | | |
| } | | | user_data_start_code = '0x0000 01B2'
user_data_identifier = '0x4741 3934'

| Syntax | No. of bits | Format |
|---|---|---|
| ATSC_user_data( ) { | | |
|     user_data_type_code | 8 | uimsbf |
|     user_data_type_structure() | | |
| } | | | user_data_type_code = '0x04'

| Syntax | No. of bits | Format |
|---|---|---|
| 3D_cc_data ( ) { | | |
|     disparity_data() | | |
|     marker_bits | 8 | '1111 1111' |
| } | | |

| Syntax | No. of bits | Format |
|---|---|---|
| disparity_data ( ) { | | |
|     cc_3d_type | 2 | bslbf |
|     if( cc_3d_type != '00' ) { | | |
|         base_view | 1 | bslbf |
|         if( cc_3d_type != '11' ) | | |
|             cc_disparity | 13 | uimsbf |
|         else | | |
|             cc_depth | 13 | uimsbf |
|     } | | |
|     else | | |
|         reserved | 6 | '111111' |
| } | | |

FIG. 26

| Syntax | No. of bits | Format |
|---|---|---|
| caption_service_descriptor ( ) { | | |
| descriptor_tag | 8 | 0x86 |
| descriptor_length | 8 | uimsbf |
| reserved | 3 | '111' |
| number_of_services | 5 | uimsbf |
| for (i=0; i<number_of_services; i++) { | | |
| language | 8*3 | uimsbf |
| digital_cc | 1 | bslbf |
| reserved | 1 | '1' |
| if (digital_cc == line21) { | | |
| reserved | 5 | '11111' |
| line21_field | 1 | bslbf |
| } | | |
| else | | |
| caption_service_number | 6 | uimsbf |
| easy_reader | 1 | bslbf |
| wide_aspect_ratio | 1 | bslbf |
| reserved | 14 | '11111111111111' |
| } | | |
| } | | |

FIG. 31

| b7 | b6 | b5 | b4 | b3 | b2 | b1 | b0 | |
|----|----|----|----|----|----|----|----|---|
| \multicolumn{8}{c|}{S3D (Set 3D Parameter) Command} | *command* |
| 3D Type Flag | | Base_View_Flag | 1 | 1 | 1 | 1 | 1 | *param1* |
| \multicolumn{8}{c|}{Disparity (or Depth) Parameter} | *param2* |

FIG. 32

| b7-b4 | CL | | GL | | | | | | CR | | GR | | | | | |
|---|---|---|---|---|---|---|---|---|---|---|---|---|---|---|---|---|
| b3-b0 | 0 | 1 | 2 | 3 | 4 | 5 | 6 | 7 | 8 | 9 | A | B | C | D | E | F |
| 0 | | EXT1 | | | | | | | | | | | | | | |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | |
| 6 | | | | | | | | | | | | | | | | |
| 7 | C0 | | G0 | | | | | | C1 | | G1 | | | | | |
| 8 | | | | | | | | | | | | | | | | |
| 9 | | | | | | | | | | | | | | | | |
| A | | S3D | | | | | | | | | | | | | | |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | |
| 0 | | | | | | | | | | | | | | | | |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | |
| 6 | | | | | | | | | | | | | | | | |
| 7 | C2 | | G2 | | | | | | C3 | | G3 | | | | | |
| 8 | | | | | | | | | | | | | | | | |
| 9 | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | |

| b7 | b6 | b5 | b4 | b3 | b2 | b1 | b0 | |
|---|---|---|---|---|---|---|---|---|
| colspan S3D (Set 3D Parameter) Command ||||||||  *command* |
| 3D Type Flag | Base_View_Flag || 1 | 1 | 1 | 1 | 1 | *param1* |
| Disparity (or Depth) Parameter (Most Significant 8 Bits) |||||||| *param2* |
| Disparity (or Depth) Parameter (Least Significant 8 Bits) |||||||| *Param3* |

FIG. 37

| b7-b4 | CL | | GL | | | | | | CR | | GR | | | | | |
|---|---|---|---|---|---|---|---|---|---|---|---|---|---|---|---|---|
| b3-b0 | 0 | 1 | 2 | 3 | 4 | 5 | 6 | 7 | 8 | 9 | A | B | C | D | E | F |
| 0 | | EXT1 | | | | | | | | | | | | | | |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | |
| 6 | | | | | | | | | | | | | | | | |
| 7 | C0 | | G0 | | | | | | C1 | | G1 | | | | | |
| 8 | | | | | | | | | | | | | | | | |
| 9 | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | |
| 0 | | | | | | | | | | | | | | | | |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | |
| 6 | C2 | | | | | | | | | | | | | | | |
| 7 | | | G2 | | | | | | C3 | | G3 | | | | | |
| 8 | | S3D | | | | | | | | | | | | | | |
| 9 | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | |

METHOD FOR DISPLAYING 3D CAPTION AND 3D DISPLAY APPARATUS FOR IMPLEMENTING THE SAME

CROSS-REFERENCE TO RELATED APPLICATIONS

This application is a continuation of U.S. application Ser. No. 14/074,470 filed Nov. 7, 2013, which is a continuation of U.S. application Ser. No. 13/059,583 filed on Feb. 17, 2011, which was a 317 national stage filing of PCT/KR2009/005435 filed on Sep. 23, 2009. PCT/KR2009/005435 claims the benefit of priority of U.S. Provisional Application Nos. 61/119,337 filed on Dec. 2, 2008 and 61/120,483 filed on Dec. 7, 2008. Each of Ser. Nos. 14/074,470; 13/059,583; PCT/KR2009/005435; 61/119,337; and 61/120,483 are incorporated by reference in their entirety herein.

TECHNICAL FIELD

The present invention relates to an image display method in a display apparatus and, more particularly, to a caption display method. Also, the present invention relates to a display apparatus adaptive for implementing the image display method.

BACKGROUND ART

Closed caption broadcasting is a broadcast service of separately transmitting text data not merged with a television broadcast image to allow a television receiver to selectively display the text as a caption. In NTSC (National Television System Committee) analog TV broadcast, caption data is transmitted by two bytes each time as analog waveforms at line 21 of first and second fields of a vertical blanking interval (VBI), so that a receiver can display the caption data on its screen. Meanwhile, according to ATSC (Advanced Television Standards Committee) digital television broadcasting standard, two bytes of closed caption data can be inserted into extension_and_user_data( ) structure of a picture header as a sort of user data, and control information for reproducing the closed caption can be defined in an Event Information Table (EIT) of Program and System Information Protocol (PSIP) (See "ATSC Digital Television Standard Part 4—MPEG-2 Video System Characteristics (A/53, Part 4:2007), with Amendment No. 1" and "Digital Television (DTV) Closed Captioning, CEA-708-B"). The receiver can accumulate the caption data byte pairs received through the picture header according to the CEA-708-B standard to interpret and display the closed caption according to the definition or specification made by the transmitting party.

The DTV closed caption (DTVCC) compliant with the CEA-708-B standard will now be described briefly with reference to FIGS. 1 through 5.

DTVCC data is transmitted according to a data communications protocol of particular format. FIG. 1 shows the protocol stack of the DTVCC. The protocol stack includes five layers: a transport layer, a packet layer, a service layer, a coding layer, and an interpretation layer.

The transport layer represents a mechanism in which the DTVCC data is inserted into a DTV video sub-system and extracted by the receiver, and is defined in the ATSC A/53 and ISO/IEC 13818 standards. In detail, the DTVCC data is divided in a unit of two bytes and transmitted through picture user data of DTV stream, and a signaling descriptor is transmitted through a Program Mapping Table (PMT) and/or the EIT of the PSIP.

FIG. 2 illustrates a syntax of the closed caption data cc_data( ) transmitted through the picture user data. "process_cc_data_flag" is a flag indicating whether closed caption data cc_data( ) needs to be processed. If the flag is set to '1', the closed caption data should be parsed and its meaning has to be processed, while, if the flag is reset to '0', the closed caption data may be discarded. "cc_count" field indicates the number of caption data constructs following this field and can have a value from 0 through 31. Each of the caption data constructs of the cc_count carries sixteen bits of caption data through a pair of "cc_data_1" and "cc_data_2" fields. When "cc_valid" field is set to 1, it indicates that the two caption data bytes that follow are valid. When reset to 0, the "cc_valid" field indicates that the two caption data bytes are invalid. "cc_type" field denotes a type of two caption data bytes as defined in the CEA-708-B standard. For example, if the "cc_type" field has a value of 10, it indicates that the two caption data bytes are channel packet data, and if the "cc_type" field has a value of 11, it indicates the start of new channel packet data.

Referring back to FIG. 1, prior to be encoded in the transport layer, the DTVCC data is packetized into caption channel packets according to a certain rule. The packet layer is defined by the caption channel packets. FIG. 3 shows the structure of the caption channel packet. An n byte caption channel packet consists of a one byte packet header and n−1 byte packet data. The packet header contains a sequence number and packet size data. The sequence number is three byte data rolling within a range of 0 to 3 in order to determine whether or not a packet has been lost.

The DTVCC caption channel may be divided into a set of logical sub-channels called "services." Service data are inserted into a caption channel data stream according to a time division multiplexing scheme. The service layer defines a header for closed caption channel service numbers, a service type, a service attribute, and the like. The caption channel stream can carry six standard services and up to 57 additional extended services, and thus allows 63 total services. FIG. 4 shows the structure of a service block with respect to each service. A service block includes a service block header and service block data. The service block header includes a service number and service block size data. If the number of services is 6 or smaller, the service block header has one byte, while if the number of services exceeds 6, the service block header has two bytes.

Referring back to FIG. 1, the coding layer describes how data are coded for the closed caption services. In other words, the coding layer defines the assignment of numeric codes for code space control, caption commands, and caption characters and symbols. FIG. 5 shows a code space organization according to the CEA-708-B standard. The code space consists of two code books each having 256 positions, and are divided into four code groups: CL, GL, CR, and GR. The CL group includes 32 codes from 00h to 1Fh, and C0 code set (miscellaneous control codes) and C2 code set (extended miscellaneous control codes) are mapped to this space. The GL group includes 96 codes from 20h to 7Fh, and a G0 code set (a character set) and G2 code set (extended control code set 1) are mapped to this space. The CR group includes 32 codes from 80h to 9Fh, and C1 code set (caption control codes) and C3 code set (extended control code 2) are mapped to this space. The GR group includes 96 codes from A0h to FFh, and G1 code set (Latin characters) and G3 code set (future characters and icon expansion) are mapped to this space.

Basic codes among the four code groups (CL, GL, CR, and GR) are characters, control codes, and commands of C0, C1, G0, and G1 code sets at an upper portion of the code space shown in FIG. 5. C2, C3, G2, and G3 code sets at a lower portion of the code space shown in FIG. 5 can be accessed by using an 'EXT1' code (10h) of the C0 code set. That is, by prefixing the codes by the 'EXT1' code, extended C2, C3, G2, and G3 code sets are referenced. In other words, two bytes (i.e., 'EXT1'+basic code) must be used in order to reference characters in the C2, C3, G2, and G3 code sets.

The interpretation layer defines the DTVCC graphic user interface, namely, how caption data are encoded by using the code sets of the coding layer and how the caption data are interpreted when decoded. The interpretation layer deals with a caption screen, window, pen, text, and display synchronization.

According to closed caption broadcasting implemented by such a protocol, words of speakers, lyrics of songs, movie lines translation, online TV guide, an emergency broadcast, and various other text services can be provided. Recently, as closed caption broadcasting tends to become mandatory limitedly in terms of media access rights of the hearing impaired or universal services, the closed caption broadcasting is expected to expand its utilization.

Meanwhile, the advancement of television technology has reached a level of implementing an apparatus for displaying three-dimensional (3D) images, and a full-scale commercialization of a stereoscopic type 3D television is around the corner at the time of filing the present application. In the stereoscopic 3D display system, two images captured by use of two image sensors spaced apart by about 65 millimeters like the human eyes are transmitted as broadcast signals to a receiver. Then, the receiver allows the two images to be inputted to the left and right eyes of a user to simulate the binocular disparity producing deep perception or stereoscopic.

In order to implement the closed caption in such a stereoscopic 3D television, it is necessary to reveal the closed caption on both the left and right images. If, however, the caption is displayed at the same position of the left and right images in a state that all the objects within the left and right images are displayed with disparity to simulate binocular disparity, the caption display will be incomplete and break down the 3D display to confuse the viewers and result in a headache or nausea.

Even though the ATSC digital television standard (A/53) and its supplemental standard, i.e., the Program and System Information Protocol (PSIP) standard (A/65C) and the DTVCC standard (CEA-708-B) describes transmission of closed caption, the specification of these standards are merely suitable for transmitting closed caption data for common two-dimensional television, not applicable for the 3D television. If 3D caption data are to be transmitted according to these standards, the caption data for each image of the 3D image pair should be transmitted separately, which results in a substantial reduction of available bandwidth by a half causing a problem of inefficient use of resources.

Thus, a method for effectively displaying closed captions compatible with 3D images in a receiver without degrading the efficiency of bandwidth resources is required.

DISCLOSURE

Technical Problem

Therefore, it is an object of the present invention to provide a 3D caption display method for harmoniously merging and displaying closed caption with 3D image in a 3D display apparatus.

It is another object of the present invention to provide a 3D display apparatus suitable for implementing the closed caption display method.

Technical Solution

According to the present invention, when the 3D display apparatus receives image signals of first and second images for implementing 3D image in a stereoscopic scheme, for example, the 3D display apparatus receives closed caption data only for a base view determined from the first and second images. Then, the display apparatus determines the position of a closed caption for an extended view based on the closed caption data for the base view and a certain 3D caption information, and formats caption graphic data for the base view and the extended view to output 3D closed caption on its screen. The 3D caption information may include a 3D caption parameter, i.e., a horizontal disparity at the closed caption display position or depth information of the closed caption display position. The 3D caption parameter may be received together with the image signals, or may be received separately. However, the 3D caption parameter may be determined by the display apparatus as well.

In more detail, according to an aspect of the 3D caption display method for achieving one of the objects above, the 3D display apparatus receives a broadcast signal including a 3D image signal, and acquires caption data for a base view and 3D caption information included in the broadcast signal. Afterwards, the 3D display apparatus generates caption data for an extended view by using the 3D caption information, and formats and outputs the caption data for the base view and the caption data for the extended view.

Preferably, the 3D caption information is to be a horizontal disparity value. In this case, the caption data for the extended view is generated by shifting the caption data for the base view by the horizontal disparity value.

The 3D caption information may be extracted from an Event Information Table (EIT), a Program Mapping Table (PMT), or a picture header of the broadcast signal. In particular, the 3D caption information may be extracted together with the caption data from the caption signal detected from the picture header.

According to another aspect of the 3D caption display method for achieving one of the objects above, a 3D display apparatus receives a broadcast signal including a 3D image signal, and acquires caption data and 3D caption information included in the broadcast signal. Afterwards, the 3D display apparatus acquires caption depth information included in the 3D caption information and displays the caption data on its display screen by using the caption depth information.

Meanwhile, a 3D display apparatus for achieving another one of the objects above includes a signal receiving unit and a synthesizing and output unit. The signal receiving unit receives a broadcast signal including a 3D image signal, restores the image signal, and acquires caption data for a base view and 3D caption information included in the broadcast signal. The synthesizing and output unit generates caption data for an extended view by using the 3D caption information, and formats and outputs the caption data for the base view and the caption data for the extended view.

Preferably, the signal receiving unit may include: a demodulation unit configured to receive a broadcast signal, demodulate the received broadcast signal, and output a transport stream; a demultiplexer configured to demultiplex the transport stream to output a coded image signal and signaling information; a signaling information processing unit configured to extract the 3D caption information from the signaling information; an image discriminating and analyzing unit configured to parse the coded image signal to extract a picture header; and a caption decoding unit configured to extract the caption data for the base view from the picture header.

Alternatively, however, the signal receiving unit may include: a demodulation unit configured to receive and demodulate a broadcast signal to output a transport stream; a demultiplexer configured to demultiplex the transport stream to output a coded image signal; a video decoder configured to parse the coded image signal to extract a picture header; and a caption decoding unit configured to extract the caption data for the base view and the 3D caption information from the picture header.

One embodiment of the synthesizing and output unit includes a graphic generator, first and second mixers, and a formatter. The graphic generator may generate a base view caption image signal based on caption data for the base view, and generate an extended view caption image signal based on the caption data for the generated extended view. The first mixer may synthesize a base view image signal and the base view caption image signal, and the second may synthesize an extended view image signal and the extended view caption image signal. The formatter may format output signals of the first and second mixers according to a stereoscopic output scheme.

Another embodiment of the synthesizing and output unit includes a graphic generator, first and second formatters, and a mixer. The graphic generator may generate a base view caption image signal based on the caption data for the base view, and generate an extended view caption image signal based on the caption data for a generated extended view. The first formatter formats the base view image signal and the extended view image signal according to a stereoscopic output scheme, and the second formatter may format the base view caption image signal and the extended view caption image signal according to the stereoscopic output scheme. The mixer synthesizes output signals of the first and second formatters.

Advantageous Effects

According to the present invention, the 3D display apparatus can harmoniously merge the closed caption with 3D images, so as to effectively reveal high quality 3D images without confusing the 3D recognition system of a viewer.

In particular, even when closed caption data is provided only for a single image among plurality of 2D images for implementing a 3D image instead that all the 2D images are provided separately, a receiver can display the 3D caption based on the 3D caption parameter. Thus, it is possible to prevent reduction of substantial bandwidth available in transmission of the 3D caption data.

DESCRIPTION OF DRAWINGS

The present invention will become more fully understood from the detailed description given herein below and the accompanying drawings. The same reference numerals will be used throughout the drawings to designate the same or similar elements. In the drawings:

FIG. 2 illustrates the syntax of closed caption data cc_data( )transmitted through picture user data according to ATSC A/53 standard;

FIG. 3 shows the structure of a caption channel packet compliant with CEA-708-B standard;

FIG. 5 shows the configuration of a code space compliant with CEA-708-B standard;

FIG. 7 illustrates the syntax of user data bit stream for transmitting closed caption data in the system of FIG. 6;

FIG. 8 illustrates the syntax of the closed caption data shown in FIG. 7;

FIG. 9 illustrates the syntax of SEI RBSP payload bit stream suitable for transmitting closed caption data in an embodiment where stereoscopic image pair is encoded according to H.265/AVC standard;

FIG. 10 illustrates the syntax of a caption service descriptor included in Event Information Table (EIT) transmitted by the system of FIG. 6;

FIG. 25 illustrates the syntax of disparity_data( ) in which the system of FIG. 24 transmits a 3D caption parameter;

FIG. 26 illustrates the syntax of the caption service descriptor included in the Event Information Table (EIT) transmitted by the system of FIG. 24;

FIG. 31 illustrates an example of a coding format of Set 3D parameter (S3D) command for delivering 3D caption information;

FIG. 32 illustrates the position of the Set 3D parameter command in a code space according to an exemplary embodiment of the present invention;

FIG. 36 illustrates another example of a coding format of the Set 3D parameter command for delivering 3D caption information; and FIG. 37 illustrates the position of the Set 3D parameter command of FIG. 36 in a code space according to an exemplary embodiment of the present invention.

BEST MODE

First Embodiment

Figure 6:
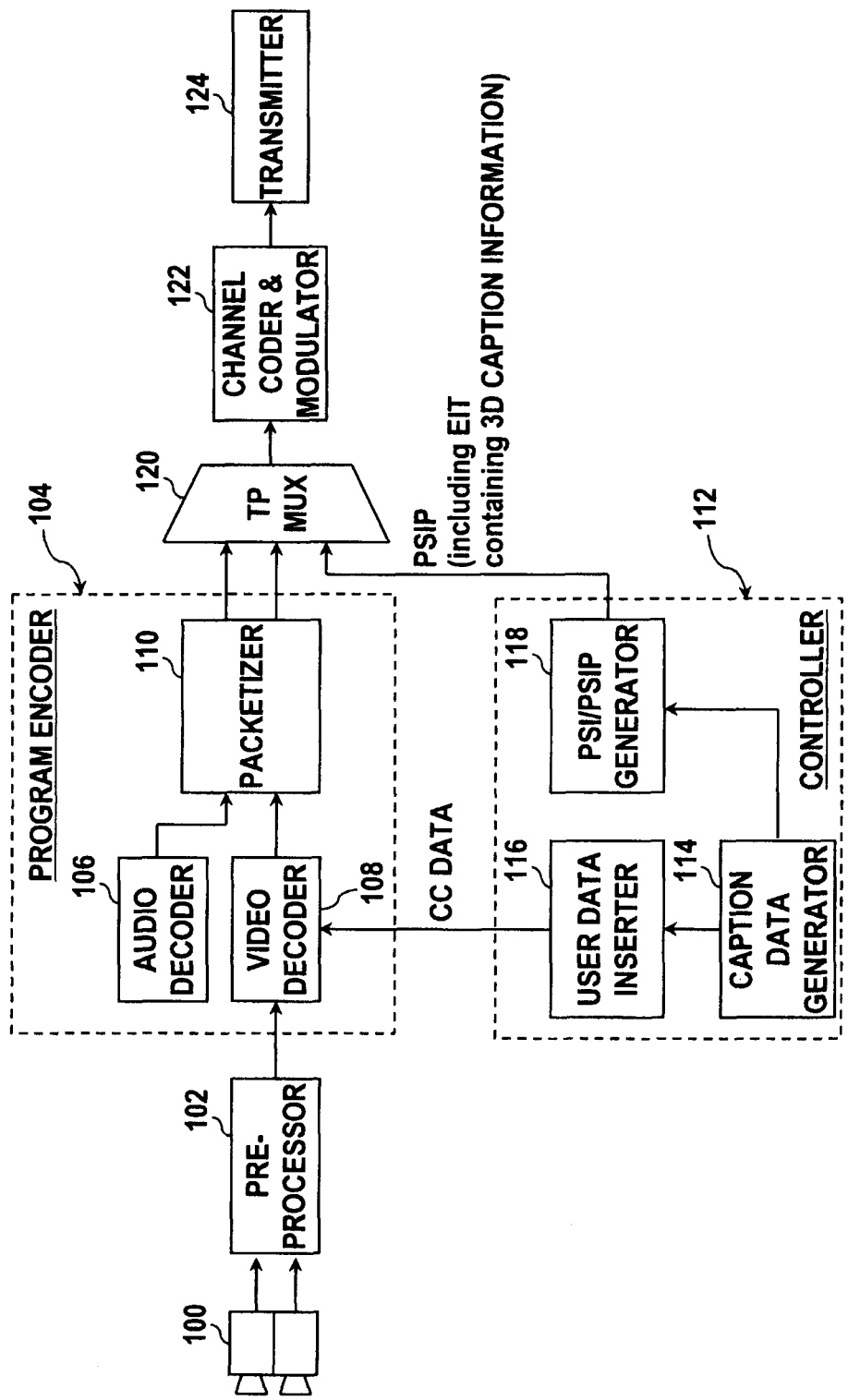
FIG. 6 is a schematic block diagram of a broadcasting system according to an exemplary embodiment of the present invention.

FIG. 6 shows a broadcasting system according to an exemplary embodiment of the present invention. The broadcasting system of FIG. 6 includes a binocular camera 100, a preprocessor 102, a program encoder 104, a controller 112, a transport multiplexer 120, a channel coding and modulation unit 122, and a transmitter 124.

The binocular camera 100 includes two lenses and corresponding image pick-up devices, and captures a pair of two-dimensional (2D) images for a front view. Similarly to human eyes, the two lenses and image pickup apparatus are disposed apart by 65 millimeters (mm), and thus the camera 100 acquires two 2D images having horizontal parallax. In this description including appended claims, of the two 2D images constituting stereoscopic image pair, an image acquired through the left lens will be referred to as a left image, and another image acquired by the right lens will be referred to as a right image.

The preprocessor 102 removes noise that may be present in the left and right original images acquired by the camera 100, corrects the images, and resolves luminance unbalancing. The images may be stored in a storage unit or edited before or after the preprocessing performed by the preprocessor 102, and thus there may be some considerable time difference between the image capturing by the camera 100 and image coding performed by the program encoder 104.

In the program encoder 104, an audio encoder 106 receives audio signals from a plurality of microphones (not shown in the drawing) installed at proper locations of an image capturing spot and encodes the received audio signal according to a predetermined standard, e.g., AC-3 standard, to generate an audio Elementary Stream (ES).

A video encoder 108 encodes the images acquired by the camera 100 according to a certain standard and compresses the encoded images by removing temporal and spatial redundancies to generate a video Elementary Stream (ES). The video encoder 108 receives user data from a user data inserter 116 to insert into a picture header while encoding the images. In particular, the user data includes closed caption data. In an exemplary embodiment of the present invention, the video encoder 108 encodes video signals according to MPEG-2 standard of ISO/IEC 13838-2, and ATSC digital television standard of A/53 Part 4. However, without being limited thereto, the video encoder 108 may encode the video signals according to H.264/AVC standard drafted by ISO/IEC JTC1/SC29/WG11 and Joint Video Team (JVT) of ITU-T SG16 Q.6 or other encoding schemes.

A packetizer 110 receives the audio ES and the video ES from the audio encoder 106 and the video encoder 108, respectively, and packetizes the respective streams to generate a Packetized Elementary Stream (PES).

The controller 112 includes a caption data generator 114, a user data inserter 116, and a PSI/PSIP generator 118. The controller 112 controls general operation of the system, and generates user data, Program Specification Information (PSI), and Program and System Information Protocol (PSIP) data required for encoding the video signals.

The caption data generator 114 receives time-stamped caption data through a network or by recording medium from an external workstation, packetizes the received data into caption channel packets shown in FIG. 3. In transmitting the stereoscopic 3D image pair, one of the two images may be designated as a base view and the other one may be designated as an extended view. Preferably, caption window position information is generated with respect to the base view. In addition, the caption data generator 114 provides caption service information indicating types and attributes of caption services to the PSI/PSIP generator 118. In the present exemplary embodiment, the caption service information includes 3D caption information such as information indicating whether or not the closed caption service is three dimensional, parameters for supporting 3D caption (referred to as '3D caption parameter', hereinbelow), and the like. The 3D caption parameter may be depth data indicating a forward/backward position of a caption in a 3D image or a horizontal disparity indicating the difference between caption display position in the extended view and that in the base view.

The user data inserter 116 provides the video encoder 108 with extension data and user data to be inserted at a sequence level, a GOP level, or a picture level during the encoding process. In particular, the user data inserter 116 provides the video encoder 108 with caption channel packets from the caption data generator 114 as a sort of user data, so that the video encoder 108 encodes the video signal after including the caption channel packets in the picture header in a unit of two bytes.

The PSI/PSIP generator 118 generates PSIP data. A Program Mapping Table (PMT) or an Event Information Table (EIT) in the PSIP includes a caption service descriptor for describing caption service information. In particular, according to the present exemplary embodiment, the caption service descriptor includes the 3D caption information for supporting the 3D caption.

Figure 1:
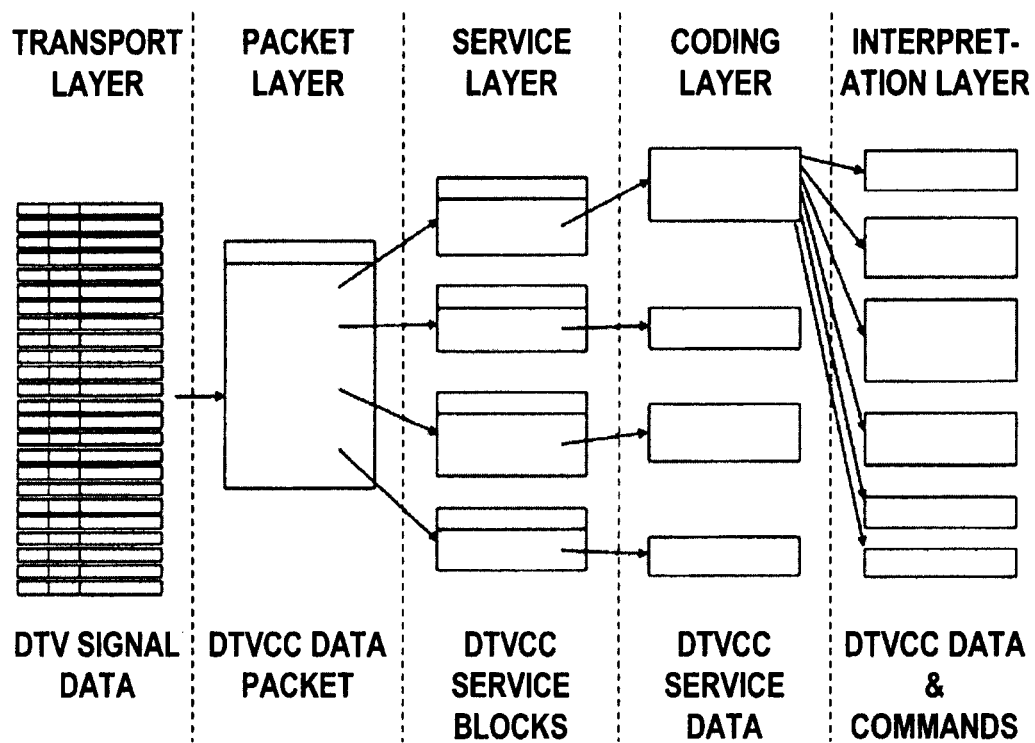
FIG. 1 illustrates a protocol stack of a digital television closed caption (DTVCC) compliant with CEA-708-B standard.

The transport multiplexer 120 multiplexes PES's and the PSI/PSIP information and adds a header to generate a Transport Stream (TS). While the system of FIG. 1 transmits a single channel of terrestrial broadcast signal, an alternative system which transmits multiple broadcast signals via, for example, a cable network or a satellite network may additionally include a transmission multiplexer for multiplexing the broadcast signals to generate a Program Stream. The channel coding and modulation unit 122 performs error-correction coding with respect to the TS so that a receiver can detect and correct an error that may be caused by noise in a transmission channel. In addition, the channel coding and modulation unit 122 modulates the error-correction-coded TS according to a modulation scheme, e.g., 8-VSB modulation scheme, adopted by the system. The transmitter 124 transmits the modulated broadcast signal according to channel characteristics, e.g., via an antenna.

The structure of signaling data delivering closed caption information will now be described in detail with reference to FIGS. 7 through 10.

According to the MPEG-2 standard of ISO/IEC 13838-2 and ATSC digital television standard of A/53 Part 4, extension_and_user_data( ) structure for defining extension data or user data may be inserted to a header at a video sequence, GOP, or picture level. Preferably, the closed caption data are inserted as picture user data at the picture level, namely, in extension_and_user_data( ) that can be disposed following a picture header in the video ES.

A first table of FIG. 7 shows the syntax of the picture extension and user data. A numeral '2' in the parenthesis of syntax title 'extension_and_user_data(2)' indicates that this syntax is at the picture level. As can be seen in the execution condition of 'do while' sentence, if bits appearing next within the picture header are extension_start_code or user_data_start_code, the following bit stream is regarded as the extension data or user data. Specifically, the bit stream following the extension_start_code is regarded as extension_data(2), and the bit stream following the user_data_start_code is regarded as user_data( ).

As shown in a second table of FIG. 7, picture user data (user_data( )) includes "user_data_start_code" and "user_data_identifier" fields, which are followed by user_structure( ). The value of "user_data_start_code" is set to '0x0000 01B2' according to the ISO/IEC 13818-2 standard. The "user_data_identifier" field, which is a 32-bit code indicating the syntax and meaning of user_structure( ), is set to a value of "format_identifier" as defined in the ISO/IEC 13838-1 standard. In the case of ATSC_user_data( ) as in the present invention, "user_data_identifier" is set to a value of '0x4741 3934'.

The user_structure( ), which is a variable length data structure defined by the value of "user_data_identifier" field, includes "user_data_type_code" field and user_data_type_structure( ) as shown in a third table of FIG. 7. "user_data_type_code" is a 8-bit value indicating a type of ATSC user data. When the "user_data_type_code" has a value of '0x03', it indicates closed caption data.

FIG. 8 illustrates the syntax of the closed caption data, cc_data( ).

"process_cc_data_flag" is a flag indicating whether or not the closed caption data cc_data( ) has to be processed. When the "process_cc_data_flag" is set to 1, the closed caption data has to be parsed and processed, whereas, when the "process_cc_data_flag" is set to 0, it indicates that the closed caption data can be discarded. The "cc_count" field indicates the number of caption data constructs following this field, and can have a value 0 through 31. The specific value of the "cc_count" field is set according to a frame rate and a coded picture data structure such that a fixed bandwidth of 9600 bps is maintained for the closed caption payload data.

For each of the cc_count number of caption data constructs, sixteen bits of closed caption data are carried in the byte pair of "cc_data_1" and "cc_data_2" fields. When set to 1, "cc_valid" field indicates that the two caption data bytes that follow are valid. When reset to 0, "cc_valid" field indicates that the two caption data bytes that follow are invalid. "cc_type" field denotes a type of two closed caption data bytes as defined in the CEA-708-B standard. For example, if the "cc_type" field has a value of 10, it indicates that the two closed caption data bytes are channel packet data, and if the "cc_type" field has a value of 11, it indicates the start of a new channel packet.

In this manner, according to an exemplary embodiment of the present invention, two 2D images constituting the stereoscopic image pair are encoded according to the MPEG-2 standard, and the closed caption data is inserted as user data in the picture header of the video ES. In this case, however, the images may be encoded according to another encoding scheme, for example, the H.265/AVC standard drafted by the ISO/IEC JTC1/SC29/WG11 and Joint Video Team (JVT) of ITU-T SG16. In case that the images are encoded according to the H.264/AVC standard, closed caption data may be included in Supplemental Enhancement Information (SEI).

FIG. 9 illustrates the syntax of an SEI RBSP payload bit stream suitable for transmitting closed caption data in an alternative embodiment where the stereoscopic image pairs are encoded according to the H.265/AVC standard.

In the syntax shown in FIG. 9, "itu_t_t35_country_code" is a 8-bit country code specified in ITU-T Rec. T35, Annex A, and has a value of '0x61' in case of Korea. The "itu_t_t35_provider_code" is a 16-bit code having a value of '0x0031'. "user_identifier" is a 32-bit code, and can indicate that the syntax structure of user_structure( ) follows the definition in ATSC A/53 by a value of '0x4741 3934'. In such a case, the user_structure( ) may be used in the same manner as that defined in the ATSC digital television standard, namely, an A/53 Part 4 Section 6.2.3. Accordingly, closed caption data can be specified by the user data syntax shown in the third table of FIG. 7 and the closed caption syntax of FIG. 8.

Meanwhile, caption service information describing a type and attributes of a caption service carried by picture user data is transmitted to the receiver separately from caption data. In the present exemplary embodiment, the caption service information is generated according to the ATSC A/65 standard, included in a caption service descriptor, and transmitted through the Event Information Table (EIT) and/or the Program Mapping Table (PMT) of MPEG-2 Transport Stream.

FIG. 10 illustrates the syntax of bit stream of the caption service descriptor included in the EIT according to the present exemplary embodiment. In general, the caption service descriptor is a descriptor for signaling closed caption information, and is used for transmitting information such as the type of the closed caption (e.g., NTSC line-21 closed caption service or digital TV closed caption service), a caption language, and the like. As mentioned above, according to the present exemplary embodiment, the caption service descriptor includes 3D caption information in addition to these information. The 3D caption information includes information as to whether or not the closed caption service is three dimensional, and a 3D caption parameter for supporting the 3D caption. The 3D caption parameter may be a caption depth value or a horizontal disparity value between the caption display position for the base view and that for the extended view.

"descriptor_tag" is an 8-bit field that identifies a type of a descriptor, and has a value of '0x86' in case of the caption service descriptor. "descriptor_length" field is a count of the number of bytes following this field within the descriptor. "number_of_services" field is a 5-bit integer in a range 1 through 16 indicating the number of closed caption services present in the EIT.

Each iteration in 'for' loop defines a single closed caption service present as a single sub-stream within a closed caption stream of 9600 bps. Each iteration provides the service language, attribute, and relevant caption service number. "language" field is a 3-byte language code indicating the language associated with a closed caption service, and has a value specified by ISO 639.2/B standard. When "digital_cc" field is clear, the "language" field has no meaning. When set to 1, the "digital_cc" field indicates that a digital TV closed caption service is present. When the "digital_cc" field is clear, this field indicates that the NTSC line-21 closed caption service is present. "line21_field" is deprecated and may be set to 1 or clear. "caption_service_number" field is a 6-bit integer in the range 0 through 63 identifying a caption service number within the closed caption stream associated with the language and attributes defined in a current iteration of the 'for' loop. This field is defined only when the "digital_cc" field indicates the digital TV closed caption service. "easy_reader" field is a logic flag which indicates, when set to 1, that the closed caption service contains text tailored to the needs of a beginner. If this field is clear, it indicates that the closed caption service is not tailored. The "easy_reader" field has no meaning when the "digital_cc" field is clear. "wide_aspect_ratio" field is a logic flag. The "wide_aspect_ratio" field indicates, when set to 1, that the closed caption service is formatted for displays with aspect ratio of 16:9. When the "wide_aspect_ratio" field is clear, the closed caption service is formatted for displays with aspect ratio of 4:3. This field has no meaning if the "digital_cc" field is clear.

"cc_3d_type" field indicates the presence of the 3D caption parameter for a 3D stereoscopic display and a type of the 3D caption parameter. The "cc_3d_type" value of '00' indicates that the data bits following this field must be discarded regardless of the 3D caption parameter, i.e., the "cc_disparity" field or the "cc_depth" field. The "cc_3d_type" value of '01' indicates that the "cc_disparity" field should be parsed and processed, and the "cc_disparity" field is expressed in units of pixel numbers. The "cc_3d_type" value of '10' indicates that the "cc_disparity" field should be parsed and processed, and the "cc_disparity" field is expressed in a ratio (%) with respect to the width of the display. The "cc_3d_type" value of '11' indicates that the "cc_depth" field should be parsed and processed.

"base_view" field defines a base view which serves as a reference of the stereoscopic image pair, i.e., left and right images. In the present exemplary embodiment, the left view is the base view if the "base_view" field is 0, and the right view is the base view if the "base_view" field is 1.

The "cc_disparity" field, which is a horizontal disparity value between the base view and an extended view at a caption display position when the caption is displayed on a stereoscopic display, denotes the caption display position for the extended view with respect to the caption display position for the base view. Thus, the receiver can obtain the closed caption display position for the extended view by shifting the closed caption position for the base view by the horizontal disparity. As mentioned above, the data format of the "cc_disparity" field may be indicated by the "cc_3d_type" field. In the above description, the horizontal disparity value denoted by the "cc_disparity" field can be expressed by the number of pixels or a ratio (%) with respect to the display width. Alternatively, however, the "cc_disparity" may be expressed by physical length (e.g., centimeters or inches) as well. When the "cc_disparity" field is intended to be expressed by the physical length, the "cc_3d_type" field may be defined to substitute either the pixel number or the ratio to the display width, or a certain field may be newly defined besides the "cc_3d_type" field.

The "cc_depth" field denotes the depth of the caption in the stereoscopic 3D image. When the 3D video data includes depth information, the depth data for the caption can be provided to the receiver instead of the horizontal disparity (cc_disparity), so that the receiver can determine the caption display position in the 3D images by applying the depth data. Preferably, the size and scale of the depth may be equal to depth information of the video data so that the receiver can interpret it in the same manner. Even though the depth value for the video data may have a negative or positive value, a depth map which maps the depth value of a value of [0.255] may be constructed. Preferably, the caption depth is expressed in this manner. Meanwhile, in constructing the depth map, the depth value may be mapped into a value of [0.255] in a linear scale. Alternatively, however, the depth value may be mapped, for example, in a logarithmic scale in consideration of perception characteristics of human beings.

Figure 11:
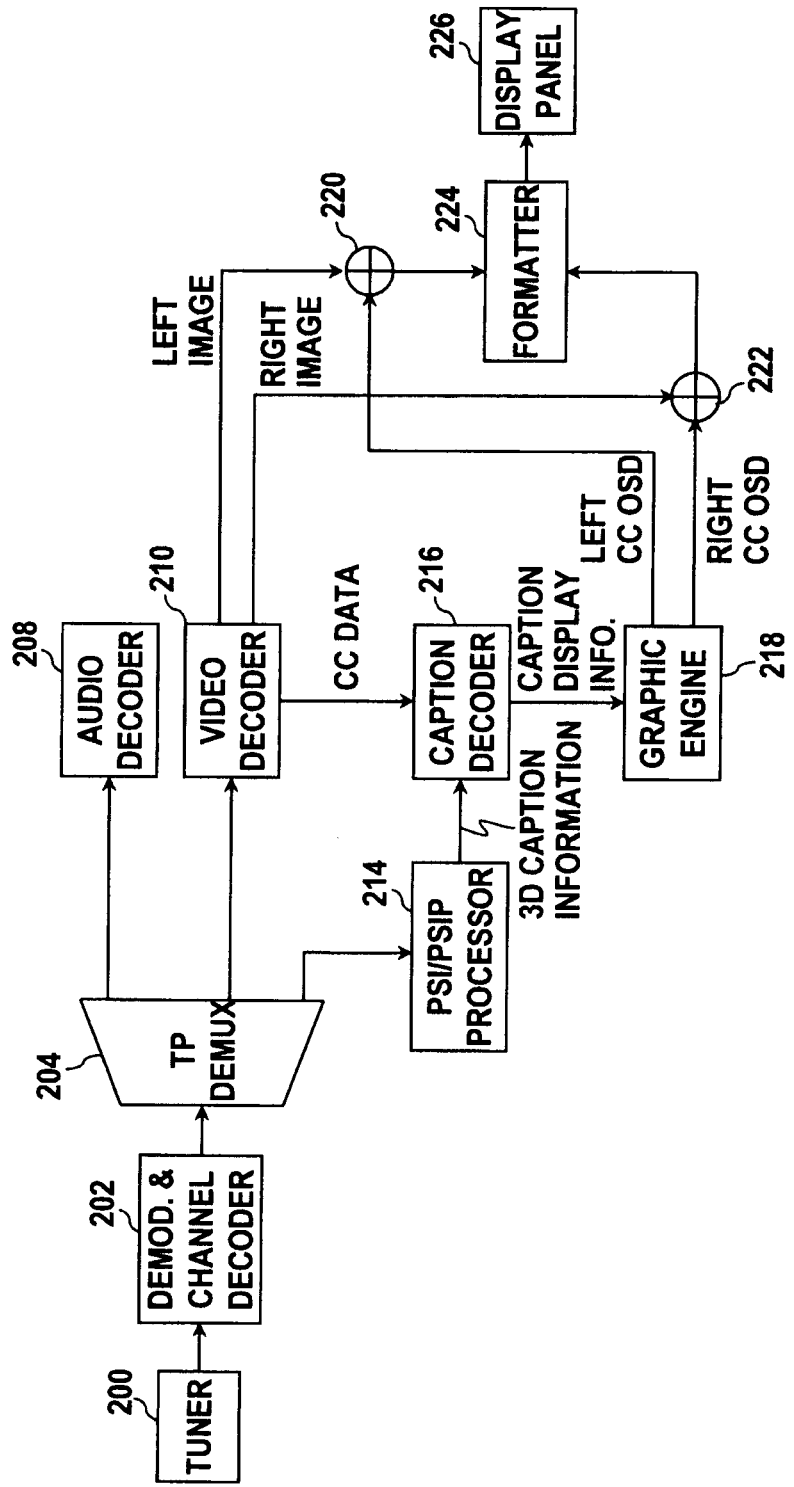
FIG. 11 is a schematic block diagram of a television receiver according to a first exemplary embodiment of the present invention.

FIG. 11 is a schematic block diagram of a television receiver for receiving the broadcast signal transmitted by the system of FIG. 6. The television receiver according to the present exemplary embodiment is suitable for receiving the terrestrial broadcast signal to reproduce images.

A tuner 200 selects a broadcast signal of a certain channel selected by the user among a plurality of broadcast signals inputted via an antenna not shown in the drawing. A demodulation and channel decoding unit 202 demodulates the broadcast signal from the tuner 200 and performs error-correction-decoding with respect to the demodulated signal to output the Transport Stream (TS). A transport demultiplexer 204 demultiplexer the TS to separate a video ES and an audio ES and extract PSI/PSIP information.

An audio decoder 208 decodes the audio ES to output a digital audio bit stream. The audio bit stream is converted into an analog audio signal by a digital-to-analog converter (not shown), amplified by an amplifier (not shown), and then outputted via a speaker (not shown). A video decoder 210 parses the video ES to extract extension and user data and an MPEG-2 video bit stream. The video decoder 210 extracts closed caption data cc_data( ) from the extension and user data to output to a caption decoder 216. The video decoder 210 decodes the MPEG-2 video bit stream to output left and right video signals for implementing a stereoscopic 3D image pair. The decoding process by the audio decoder 208 and the video decoder 210 may be performed based on a packet ID (PID) detected by a PSI/PSIP processor 214.

The PSI/PSIP processor 214 receives and parses the PSI/PSIP information from the transport demultiplexer 204 to store in a memory not shown in the drawing or a register, so that the broadcast images are reproduced based on the stored information. The EIT of the PSIP received by the receiver includes the caption service descriptor which contains the caption service information describing the type and attributes of a caption service. The PSI/PSIP processor 214 provides the caption service information to a caption decoder 216, so that the caption decoder 216 can decode caption data based on the caption service information. In particular, according to the present exemplary embodiment, the caption service information received through the caption service descriptor includes the 3D caption information, namely, whether or not the closed caption service is three dimensional and a 3D caption parameter for implementing a 3D caption. Alternatively, however, the 3D caption information may be provided to a graphic engine 218 instead of the caption decoder 216, or both the caption decoder 216 and the graphic engine 218.

The caption decoder 216 receives the closed caption data cc_data( ) from the video decoder 210 and accumulates the closed caption data pairs carried by the "cc_data 1" and "cc_data_2" fields in a unit of packets. In addition, the caption decoder 216 depacketizes the caption packet data based on the caption service information from the PSI/PSIP processor 214 to restore service block data with respect to each service. Afterwards, the caption decoder 216 decodes and interprets the service block data. Meanwhile, the caption decoder 216 receives the caption service information from the PSI/PSIP processor 214 and detects base view information as well as the 3D caption parameter, i.e., the horizontal disparity value or the depth value from the 3D caption information. The caption decoder 216 generates caption display information based on the interpreted service block data and the 3D caption parameter to provide to the graphic engine 218.

The graphic engine 218 receives the caption display information from the caption decoder 216 and generates caption bitmaps for the base view and the extended view in OSD signal form based on the received caption display information. Here, the base view may be the left image and the extended view may be the right image. First, the graphic engine 218 constructs the caption bitmap for the base view using the base view information determined by the "base_view" field and the extracted closed caption data, and outputs the caption bitmap for the left image in OSD signal form. Subsequently, the graphic engine 218 constructs the caption bitmap for the extended view using the 3D caption parameter and outputs the caption bitmap for the right image in OSD signal form. When the 3D caption parameter is the horizontal disparity value, the caption bitmap for the extended view can be configured by shifting the caption bitmap for the base view by the horizontal disparity. Meanwhile, if the 3D caption parameter is the depth value, caption data corresponding to the base view is displayed on the display by use of the caption depth value, which is especially useful when depth image is additionally provided in the broadcast signal.

The first mixer 220 mixes the left image caption bitmap from the graphic engine 218 to the left image signal from the video decoder 210. The second mixer 222 mixes the right image caption bitmap from the graphic engine 218 to the right image signal from the video decoder 210. The formatter 224 formats the left and right images superimposed with respective caption bitmaps while comparing a frame time of the signals, such that temporally coincident left and right images can be displayed as a pair on a display panel 232. The formatted 3D image signal is reconstructed into a 3D image and on the display panel 226.

Meanwhile, the image synthesis of the first and second mixers 220 and 222 may be selectively performed in response to a user command. Namely, the user may manipulate, for example, a remote controller (not shown) to choose whether the closed caption window is to be displayed or not and what closed caption window among a plurality of closed caption windows is to be displayed. When such a manipulation command is applied, a controller (not shown) of the receiver may store the command in the memory and control the display of the closed caption windows with reference to the stored command.

The process of extracting closed caption information and displaying the 3D closed caption in the television receiver of FIG. 11 will now be described in detail with reference to FIGS. 12 and 13.

Figure 12:
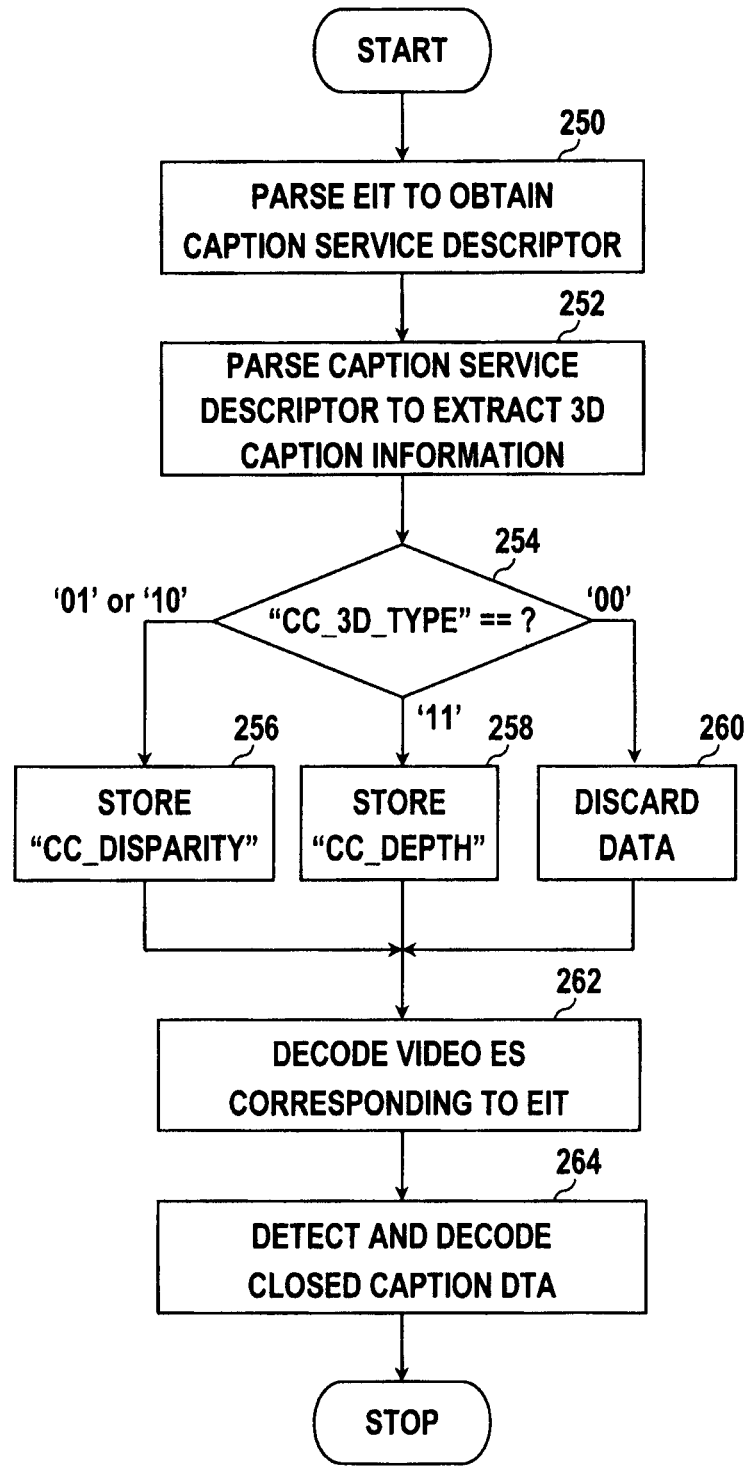
FIG. 12 is a flow chart illustrating the process of extracting 3D caption information and closed caption data in the television receiver of FIG. 11.

FIG. 12 illustrates the process of extracting the closed caption information in the television receiver of FIG. 11;

First, the PSI/PSIP processor 214 parses the PSIP to extract a Master Guide Table (MGT) of which "PID" is '0x1FFB' and "table_ID" is '0xC7' based on a packet ID (PID) and a table ID, and obtains PID information for the Event Information Table (EIT) from the MGT. Next, the PSI/PSIP processor 214 reads a TP having the acquired PID to extract an EIT of which "table_ID" is '0xC7'. And then, the PSI/PSIP processor 214 parses the EIT and detects a caption service descriptor shown in FIG. 10 for each event in the EIT (step 250).

In step 252, the PSI/PSIP processor 214 parses the caption service descriptor to extract the caption service information (step 252). The caption service information received through the caption service descriptor includes 3D caption information, namely, whether or not the closed caption service is three dimensional and a 3D caption parameter for implementing the 3D caption. Thereafter, the PSI/PSIP processor 214 stores the caption service information in the memory or in the register, so that the caption decoder 216 can decode the caption data based on the caption service information and the graphic engine 218 can generate the caption images based on the 3D caption information.

The process of storing the 3D caption information is as follows. Here, the "cc_3d_type" field value determines whether to store the "cc_disparity" or "cc_depth" field value. If the "cc_3d_type" field has a value of '01' or '10' (step 254), the PSI/PSIP processor 214 stores the horizontal disparity "cc_disparity" value as the 3D caption parameter (step 256). If the "cc_3d_type" field has a value of '11' in step 254, the PSI/PSIP processor 214 stores the caption depth "cc_depth" value as the 3D caption parameter (step 258). On the other hand, if the "cc_3d_type" field has a value of '00', the PSI/PSIP processor 214 regards the caption service as a 2D caption service, and discards the "cc_3d_type" field and the subsequent data by regarding them as meaningless reserved bits (step 260).

In step 262, the video decoder 210 parses the video ES to output extension and user data and the MPEG-2 video bit stream and decodes the MPEG-2 video bit stream. In the process of parsing the video ES by the video decoder 210, the closed caption data cc_data( ) included in the picture header or messages of the video ES is extracted and provided to the caption decoder 216. Namely, the video decoder 210 detects ATSC_user_data( ) having "user_data_identifier" value of '0x4741 3934' from the picture user data user_data( ) of the video ES, and extracts user_data_type_structure( ) having "user_data_type_code" of '0x03' as the closed caption data cc_data( ). Accumulating the caption data byte pairs, cc_data1 and cc_data2, received through the cc_data( ) in packet units, the caption decoder 216 decodes and interprets the caption data packets based on the caption service information from the PSI/PSIP processor 214 (step 264).

Figure 13:
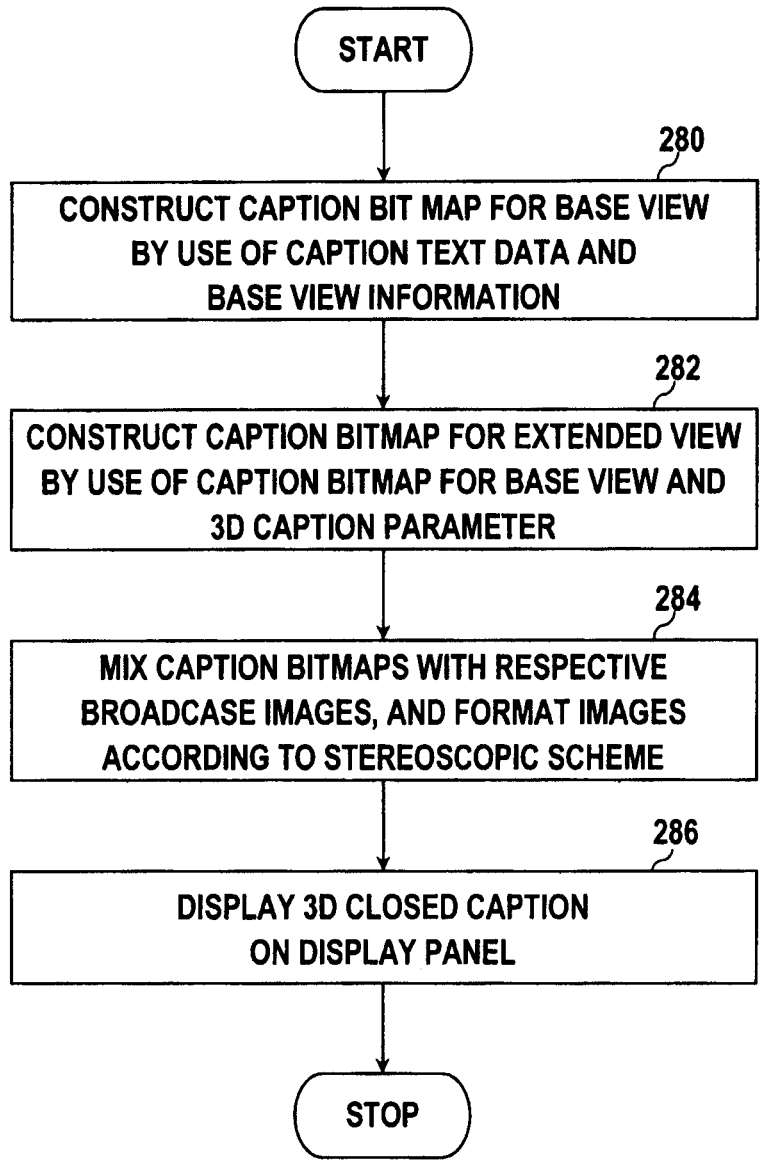
FIG. 13 is a flow chart illustrating the process of displaying 3D closed caption.

FIG. 13 illustrates the process of displaying the 3D closed caption.

Figure 14:
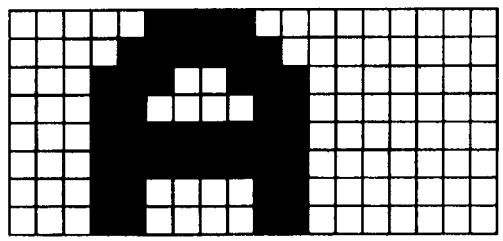
FIG. 14 illustrates an example of a caption bitmap for a base view.

In step 280, the graphic engine 218 constructs the caption bitmap for the base view by using the decoded caption text data and base view information determined by the "base_view" field. FIG. 14 shows an example of the caption bitmap for the base view, e.g., the left image. Afterwards, the graphic engine 218 constructs the caption bitmap for the extended view by using the 3D caption parameter (step 282).

Figure 15:
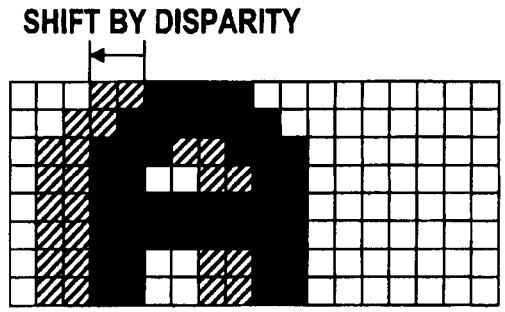
FIG. 15 illustrates the process of acquiring a caption bitmap for an extended view from the caption bitmap for the base view.

In more detail, if the 3D caption parameter stored in steps 254 to 260 is the horizontal disparity value, the caption bitmap for the extended view can be constructed by shifting the caption bitmap for the base view by the horizontal disparity, as shown in FIG. 15. Here, if the "cc_disparity" field included in the caption service descriptor has a value denoting a number of pixels or an actual physical length, the caption bitmap including a caption window for the extended view can be obtained by simply shifting the caption window for the base view by the field value. Meanwhile, if the "cc_disparity" field contained in the caption service descriptor has a value denoting a ratio with respect to the display width (i.e., if the "cc_3d_type" field has a value of '10'), rather than the number of pixels of the actual physical length, the horizontal disparity value in units of actual pixels can be calculated by Equation 1 below, where it is assumed that the "cc_disparity" is expressed in a resolution of N bits:

$$\text{Horizontal Disparity} = \frac{cc\_disparity \times display\_width}{2^{N-1}} \quad \text{[Equation 1]}$$

Figure 16:
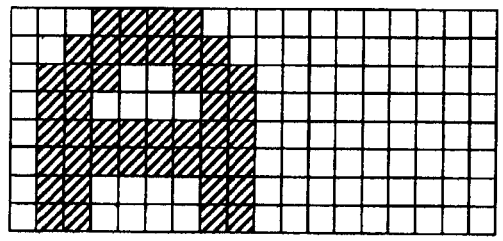
FIG. 16 illustrates an example of the caption bitmap for an extended view.

By simply shifting the caption window for the base view by the horizontal disparity, the caption bitmap including the caption window for the extended view can be obtained. FIG. 16 illustrates an example of the caption bitmap for the extended view, e.g., the right image.

Figure 17:
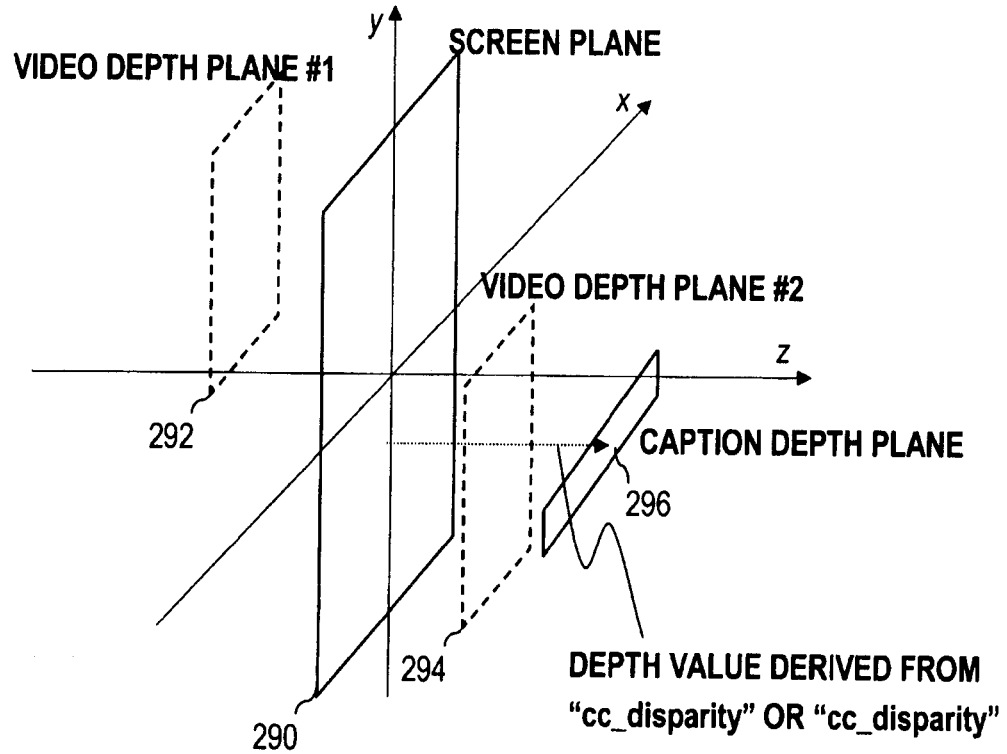
FIG. 17 illustrates an example of a reference point for measuring a closed caption depth value.

On the other hand, in case that the stored 3D caption parameter is a caption depth value, caption data corresponding to the base view is displayed on the display panel by using the caption depth value. Here, if the depth value obtained from the "cc_depth" field is mapped in a logarithmic scale or any other nonlinear scale rather than in a linear scale in a range of a [0.255], the depth value is inversely mapped in a corresponding manner. In this case, the depth value may be further adjusted by use of another information such as camera parameters or the like. FIG. 17 illustrates an example of a reference point for measuring the closed caption depth value. As shown in FIG. 17, an image depth plane 292 on which image focusing is made when the image is captured and the fixation point is generally located behind the display plane 290 of the display, and may be located in front of the display plane 290 under some circumstances (294). A depth plane 296 on which a closed caption is displayed is preferably positioned in front of the image depth planes 292 and 294. Here, the depth value of the closed caption depth plane 296 is measured from the display plane 290 and has a positive value in the direction of the viewer and a negative value in a backward direction of the display plane 290.

Figure 18:
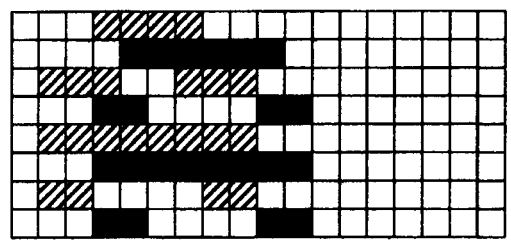
FIGS. 18 to 20 shows examples of screen images obtained by formatting left and right images superimposed by respective closed caption windows.
Figure 19:
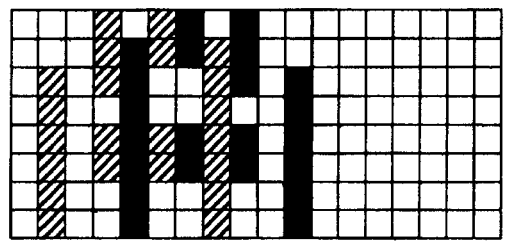
Figure 20:
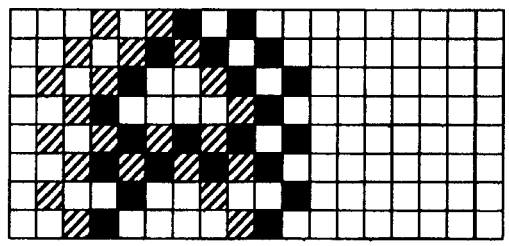

Referring back to FIG. 13, the captions for the two views are combined with the image signals, which are then formatted according to an appropriate stereoscopic display scheme in step 284. The formatted video signal is outputted through the display panel 226, and the 3D closed caption superimposed on the 3D broadcast image is outputted on the screen (step 286). FIGS. 18 to 20 show examples of screen images obtained by synthesizing the left and right images superimposed with respective closed caption windows. Specifically, FIG. 18 shows an example in which the left and right images are horizontally interleaved, so that the left and right images are alternately displayed line by line in the horizontal direction. FIG. 19 shows an example in which the left and right images are vertically interleaved, so that the left and right images are alternately displayed line by line in the vertical direction. FIG. 20 shows an example of formatting the left and right images to have a checkerboard pattern. The displayed left and right images are inputted to the left and right eyes of the viewer, respectively, through polarization glasses.

The examples of FIGS. 18 to 20 are suitable for a receiver system utilizing polarization glasses. Alternatively, however, the present invention may be applicable to a receiver system utilizing shuttered glasses as well. In the receiver system utilizing shuttered glasses, the left and right images superimposed with respective closed caption windows shown in FIGS. 14 and 16 can be alternately displayed on the display panel. And, the shuttered glasses synchronized with switching of the displayed images allow the left and right images to be transmitted to respective one of the left and right eyes of the viewer.

Figure 21:
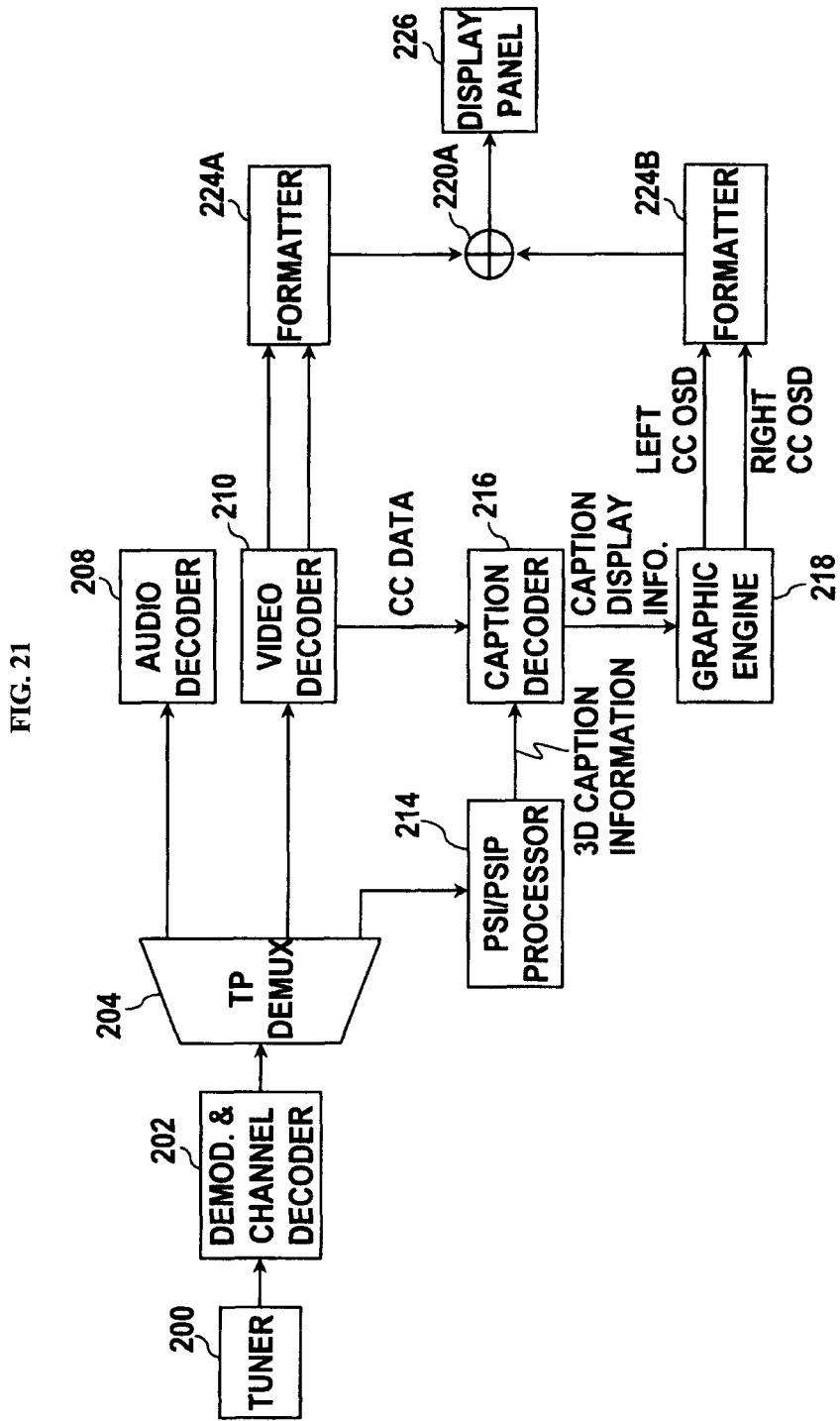
FIG. 21 is a schematic block diagram of an alternative embodiment of the television receiver of FIG. 11.

FIG. 21 is a schematic block diagram of an alternative embodiment of the television receiver of FIG. 11. In the present exemplary embodiment, left and right broadcast image signals are formatted by one formatter, and the left and right closed caption OSD signals are formatted by another formatter, and then the formatted signals are mixed. A first formatter 224A formats the left and right image signals from the video decoder 210 according to a stereoscopic output scheme. A second formatter 224B formats the left and right image caption OSD signals from the graphic engine 218 according to the stereoscopic output scheme. A mixer 220A synthesizes output signals of the first and second formatters 224A and 224B, so that the formatted image signals are displayed on the display panel 226.

Figure 22:
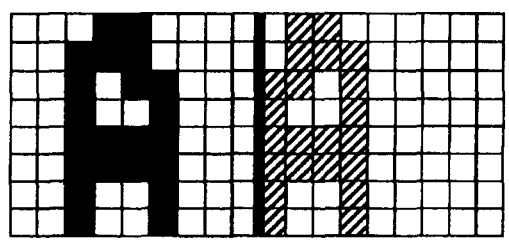
FIG. 22 illustrates an example of a caption bitmap image formatted in a side-by-side formay in the television receiver of FIG. 21.
Figure 23:
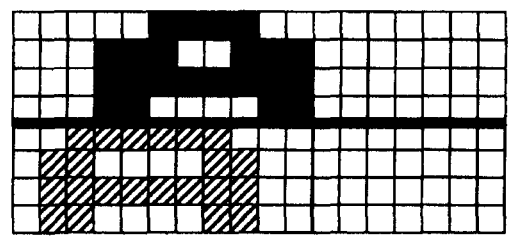
FIG. 23 illustrates an example of a caption bitmap image formatted in a top-down format in the television receiver of FIG. 21.

Assuming that the caption bitmaps for the left and right images are the same as those shown in FIGS. 14 and 16, respectively, the second formatter 224B outputs a caption bitmap image formatted in a side-by-side format shown in FIG. 22 or a top-down format shown in FIG. 23. Accordingly, the stereoscopic 3D image displayed on the display panel 226 after being mixed by the mixer 220A may have a form similar to that shown in FIG. 18 or FIG. 19. The other features of the television receiver of FIG. 21 are similar to those of the embodiment of FIG. 11, and thus detailed description thereof will be omitted.

Second Embodiment

Figure 24:
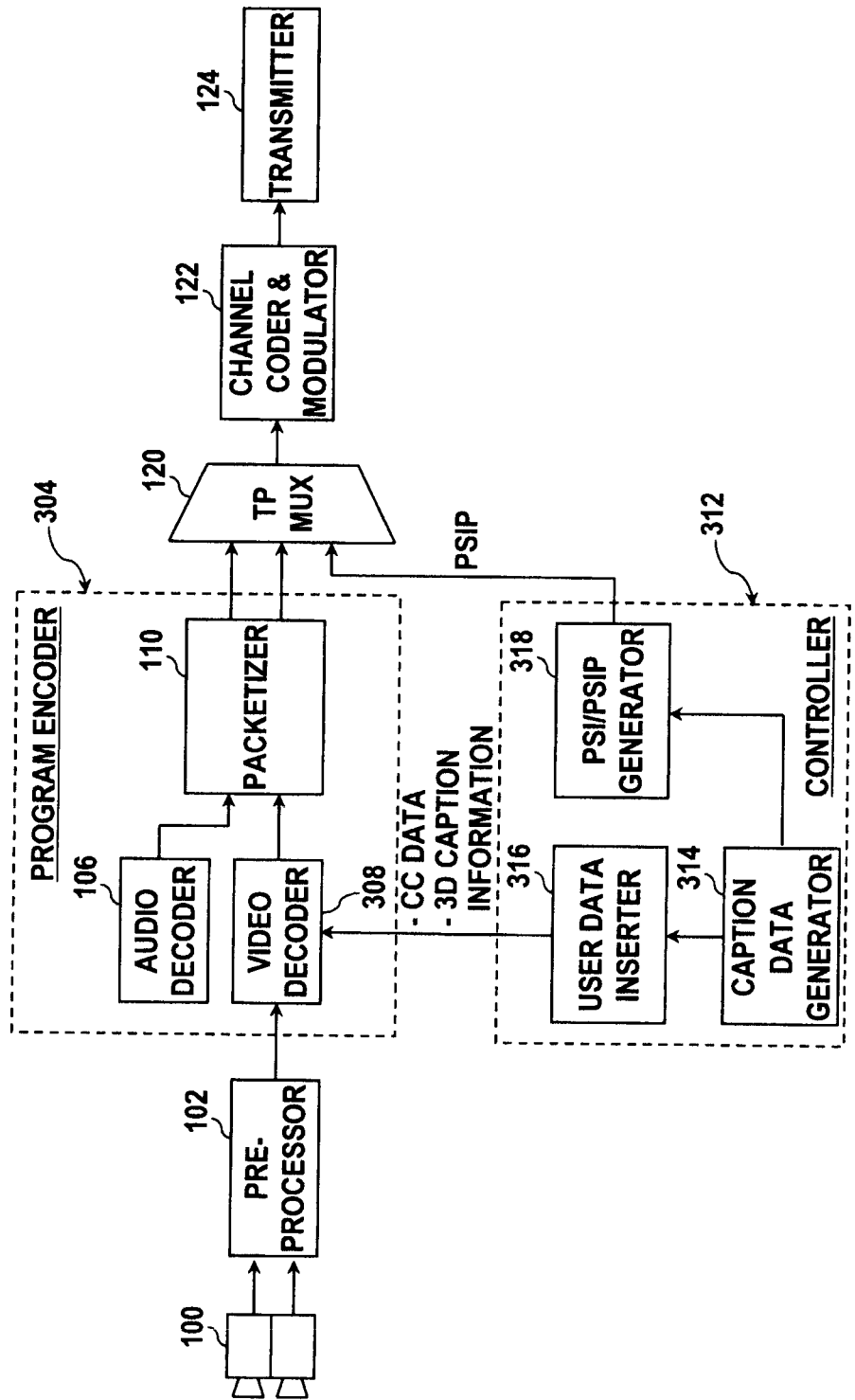
FIG. 24 is a schematic block diagram of a broadcasting system according to a second exemplary embodiment of the present invention.

In the exemplary embodiments described above, the 3D caption information which facilitates the implementation of the 3D caption by use of closed caption data for a single view is delivered to the receiver through the caption service descriptor of the EIT. Alternatively, however, the 3D caption information may be delivered in a different manner, for example, as picture user data in the video ES. FIG. 24 shows an example of a broadcasting system for implementing such a transmission scheme.

In the system of FIG. 24, a video encoder 308 receives user data from a user data inserter 316 to insert into a picture header while encoding video signals. In particular, the user data includes closed caption data and 3D caption information. Both the closed caption data and the 3D caption information are disposed within the ATSC_user_data( ) of the picture user data, and may be discriminated by "user_data_type_code" field as described above.

A caption data generator 314 receives time-stamped caption data through a network or by a recording medium from an external workstation, and generates a caption channel packet shown in FIG. 3. The caption data generator 314 provides the caption channel packet and the 3D caption information to the user data inserter 316, so that the user data inserter 316 inserts the information into the picture user data. Meanwhile, the caption data generator 314 provides caption service information indicating the type and attributes of a caption service to a PSI/PSIP generator 318 so that the PSI/PSIP generator 318 can generate an EIT.

The user data inserter 316 provides the video encoder 308 with extension data and user data to be inserted at a sequence level, a GOP level, or a picture level during the encoding process. In particular, the user data inserter 316 provides video encoder 308 with closed caption data and 3D caption information as a sort of user data, so that the video encoder 308 encodes the video signal after including the closed caption data and the 3D caption information in a picture header.

In the present exemplary embodiment, the syntax of the closed caption data provided by the user data inserter 316 and inserted into the picture header by the video encoder 308 has the same format as that shown in FIGS. 7 and 8. In the present exemplary embodiment, the closed caption data is transmitted only for one view, i.e., a base view, chosen from two or more views for implementing a stereoscopic 3D image. The 3D caption information includes information as to whether or not the closed caption service is three dimensional, base view information, and a 3D caption parameter, and is used for the receiver to implement the 3D caption based on the closed caption data provided only for the base view.

FIG. 25 illustrates the syntax of disparity_data( ) in which the system of FIG. 24 transmits the 3D caption parameter.

As described above with reference to FIG. 7, the picture user data user_data( ) includes the "user_data_start_code" and "user_data_identifier" fields, which are followed by the user_structure( ). The value of the "user_data_start_code" is set to '0x0000 01B2' according to the ISO/IEC 13838-2 standard. The "user_data_identifier" field, which is a 32-bit code indicating the syntax and meaning of the user_structure( ), is set to a value of "format identifier" as defined in the ISO/IEC 13838-1 standard. In the case of ATSC_user_data( ) according to the present invention, the "user_data_identifier" field is set to a value of '0x4741 3934'.

The user_structure ( ) is a variable length data structure defined by the value of "user_data_identifier", and includes the "user_data_type_code" field and user_data_type_structure ( ) as shown in a second table of FIG. 25. The "user_data_type_code" is a 8-bit value indicating a type of ATSC user data. When the user_data_type_code" field has a value of '0x03', it indicates closed caption data, whereas when the user_data_type_code" field has a value of '0x04', it indicates 3D closed caption parameter data.

As shown in a third table of FIG. 25, the 3D closed caption parameter data includes 3D caption information disparity_data( ). A fourth table of FIG. 25 shows the syntax of the 3D caption information disparity_data( ). Since the meaning of each field is the same as that described above in relation to the caption service descriptor illustrated in FIG. 10, detailed description thereof will be omitted.

Referring back to FIG. 24, a PSI/PSIP generator 308 generates PSI/PSIP data. The PSIP includes an Event Information Table (EIT), which includes a caption service descriptor for describing caption service information. Contrary to the embodiment of FIG. 7, in the present exemplary embodiment, the caption service descriptor may follow a general format compliant with the A/65 standard as shown in FIG. 26, rather than including 3D caption information for supporting the 3D caption.

Since the other features of the system of FIG. 24 are similar to those of the exemplary embodiment shown in FIG. 7, detailed description thereof will be omitted.

Figure 27:
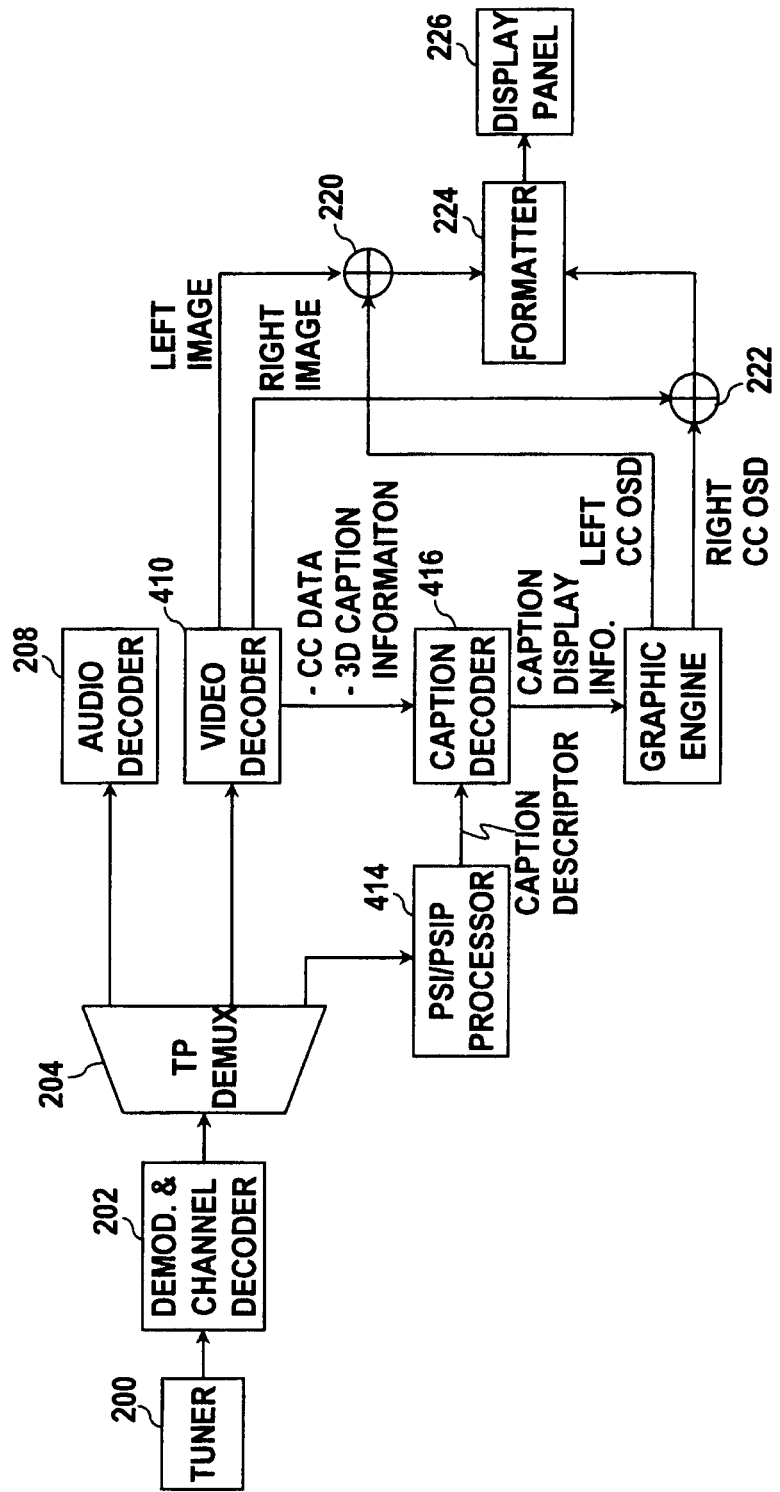
FIG. 27 is a schematic block diagram of a television receiver according to a second exemplary embodiment of the present invention.

FIG. 27 illustrates an example of a television receiver suitable for receiving the broadcast signal transmitted by the system of FIG. 24.

The tuner 200 selects a broadcast signal of a certain channel selected by the user among a plurality of broadcast signals inputted through the antenna. The demodulation and channel decoding unit 202 demodulates the broadcast signal from the tuner 200, performs error-correction-decoding with respect to the demodulated signal, and outputs the Transport Stream (TS). The transport demutiplexer 204 demultiplexes the TS to separate the video ES and the audio ES, and extracts the PSI/PSIP information.

The audio decoder 208 decodes the audio ES to output a digital audio bit stream. The audio bit stream is converted into an analog audio signal by the digital-to-analog converter, amplified by the amplifier, and then outputted through the speaker. A video decoder 410 parses the video ES to extract extension and user data and an MPEG-2 video bit stream. The video decoder 410 extracts closed caption data cc_data( ) and the 3D caption information cc_disparity( ) from the extension and user data to output to the caption decoder 216. The video decoder 410 decodes the MPEG-2 video bit stream to output left and right video signals for implementing a stereoscopic 3D image. The decoding process performed by the audio decoder 208 and the video decoder 410 may be performed based on a packet ID (PID) detected by the PSI/PSIP processor 214.

The PSI/PSIP processor 414 receives and parses the PSI/PSIP information from the transport demultiplexer 204 to store in the memory or the register, so that the broadcast images are reproduced based on the stored information. The EIT of the PSIP includes caption service descriptor which contains caption service information describing the type and attributes of the caption service. The PSI/PSIP processor 214 provides the caption service information to a caption decoder 416, so that the caption decoder 416 decodes caption data based on the caption service information. Contrary to the embodiment of FIG. 11, in the present exemplary embodiment, 3D caption information for implementing a 3D caption is not included in the caption service information carried by the caption service descriptor.

The caption decoder 416 receives the closed caption data cc_data( ) from the video decoder 410 and accumulates the closed caption data pair carried by the "cc_data_1" and "cc_data_2" fields in packet units. In addition, the caption decoder 416 depacketizes the caption packet data based on the caption service information from the PSI/PSIP processor 414 to restore service block data for each service. Afterwards, the caption decoder 416 decodes and interprets the service block data. Meanwhile, the caption decoder 416 receives the caption service information cc_disparity( ) from the video decoder 410 and detects the base view information as well as the 3D caption parameter, i.e., the horizontal disparity value or the depth value. The caption decoder 416 generates caption display information based on the interpreted service block data and the 3D caption parameter to provide to the graphic engine 218.

The graphic engine 218 receives the caption display information from the caption decoder 416 and generates caption bitmaps for the base view and the extended view in OSD signal form based on the caption display information. Here, the base view may be the left image and the extended view may be a right image. First, the graphic engine 218 constructs a caption bitmap for the base view using the base view information determined by the "base_view" field and the extracted closed caption data, and outputs the caption bitmap for the base view in OSD signal form. Subsequently, the graphic engine 218 constructs a caption bitmap for the extended view using the 3D caption parameter, and outputs the caption bitmap for the extended view in OSD signal form. When the 3D caption parameter is the horizontal disparity value, the caption bitmap for the extended view can be constructed by shifting the caption bitmap for the base view by the horizontal disparity. Meanwhile, if the 3D caption parameter is the depth value, caption data corresponding to the base view is displayed on the display by use of the caption depth value, which is especially useful when depth image is additionally provided in the broadcast signal.

The first mixer 220 mixes the left image caption bitmap from the graphic engine 218 to the left image signal from the video decoder 410. The second mixer 222 mixes the right image caption bitmap from the graphic engine 218 to the right image signal from the video decoder 410. The formatter 224 formats the left and right images superimposed with respective caption bitmaps while comparing frame time of the signals, such that temporally coincident left and right images can be displayed as a pair on a display panel 232. The formatted 3D image signal is reconstructed into a 3D image on the display panel 226.

Meanwhile, the image synthesis performed by the first and second mixers 220 and 222 may be selectively carried out in response to a user command. That is, the user may manipulate, for example, a remote controller to choose whether a closed caption window is to be displayed or not and what closed caption window among a plurality of closed caption windows is to be displayed. When such a manipulation command is applied, a controller of the receiver may store the command in the memory and control the display of the closed caption windows with reference to the stored command.

Figure 28:
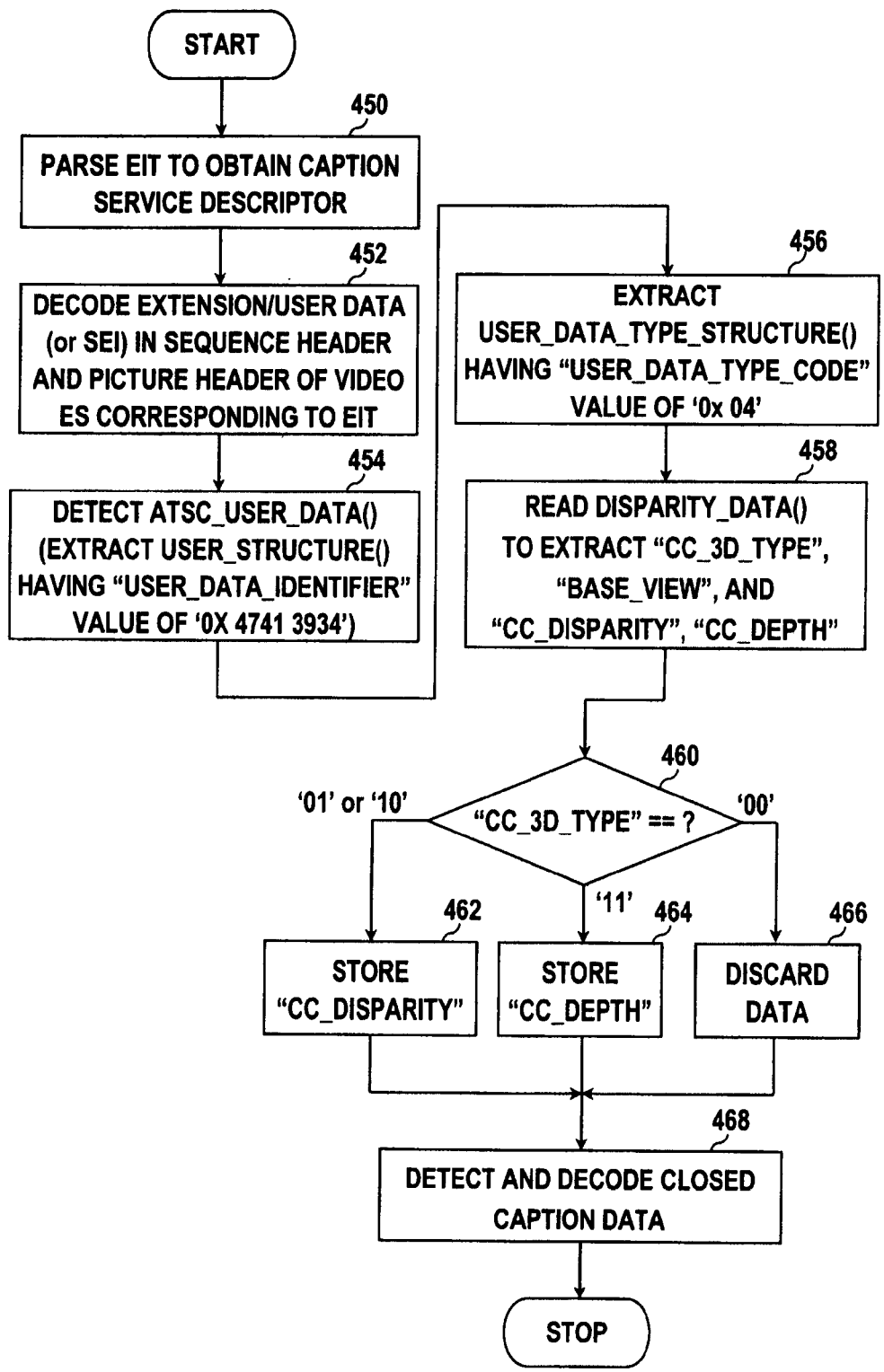
FIG. 28 is a flow chart illustrating the process of extracting closed caption data and displaying a 3D closed caption in the television receiver illustrated in FIG. 27.

The process of extracting closed caption information in the television receiver illustrated in FIG. 27 will now be described in detail with reference to FIG. 28.

First, the PSI/PSIP processor 414 parses the PSIP to extract a Master Guide Table (MGT) of which "PID" is '0x1FFB' and "table_ID" is '0xC7' based on the packet ID (PID) and a table ID, to obtain PID information of the Event Information Table (EIT) from the MGT. Next, the PSI/PSIP processor 414 reads a TP having the acquired PID to extract an EIT of which "table_ID" is '0xC7'. Subsequently, the PSI/PSIP processor 414 parses the EIT to detect the caption service descriptor shown in FIG. 26 for each event in the EIT and the caption service information (step 450).

In steps 452 to 466, the 3D caption parameter and the base view information are extracted from the 3D caption information disparity_data( ) included in the picture header of the video ES and stored in the memory. First, in step 452, the video decoder 410 parses the video ES corresponding to the EIT to output extension and user data and an MPEG-2 video bit stream, and decodes the MPEG-2 video bit stream. During the process of parsing the video ES, the video decoder 410 decodes extension_and_user_data(2) in the picture header to extract picture user data user_data( ) after extracting a header and the extension and user data. Subsequently, the video decoder 410 detects ATSC_user_data( ) having a "user_data_identifier" value of '0x4741 3934' from the picture user data user_data( ) (step 454). Thereafter, the video decoder 410 extracts user_data_type_structure( ) having "user_data_type_code" of '0x04' from the ATSC_user_data( ) to provide to the caption decoder 416 (456). Subsequently, the caption decoder 416 extracts "cc_3d_type", "base_view", and "cc_disparity" or "cc_depth" field values from the 3D caption information disparity_data( ) from the video decoder 410 (step 458).

Here, the "cc_3d_type" field value determines whether to store the "cc_disparity" or "cc_depth" field value. If the "cc_3d_type" field has a value of '01' or '10' (step 460), the caption decoder 416 stores the horizontal disparity "cc_disparity" value of the 3D caption parameter (step 462). In step 460, if the "cc_3d_type" field has a value of '11', the caption decoder 416 stores the caption depth "cc_depth" value of the 3D caption parameter (step S464). On the other hand, if the "cc_3d_type" field has a value of '00', the caption decoder 416 regards the caption service as a 2D caption service, and discards the "cc_3d_type" field and the subsequent data by regarding them as meaningless reserved bits (step 466).

Meanwhile, in an alternative embodiment where the video ES is encoded according to the H.265/AVC standard, the 3D caption information, i.e., the disparity_data( ) can be also delivered to the receiver through the SEI Raw Byte Sequence Payload (RBSP) similarly that the closed caption data cc_data( ) can be transferred through the SEI RBSP. In this case, the video decoder 410 parses an AVC NAL unit to extract SEI data having a "nal_unit_type" value of '6', and reads user_data_registered_itu_t_t35( ) having a "payloadType" value of '4'. Thereafter, the video decoder 410 detects user_data( ) having the "user_data_identifier" value of '0x4741 3934' from the picture user data user_data( ). Subsequently, the video decoder 410 extracts a user_data_type_structure( ) having a "user_data_type_code" of '0x04' from the user_data( ). Then, the caption decoder 416 reads the 3D caption information disparity_data( ) structure from the extracted data to extract "cc_3d_type", "base_view", and "cc_disparity" or "cc_depth" field values and store in the memory.

Meanwhile, in the process of parsing the video ES by the video decoder 410, the cc_data( ) included in the picture header or a message of the video ES is extracted and provided to the caption decoder 416. Namely, the video decoder 410 detects the ATSC_user_data( ) having the "user_data_identifier" value of '0x4741 3934' from the picture user data user_data( ) of the video ES, and extracts the user_data_type_structure( ) having the "user_data_type_code" of '0x03' from the ATSC_user_data( ) as the closed caption data cc_data( ). The caption decoder 416 accumulates the caption data byte pairs (cc_data1 and cc_data2) received through cc_data( ) in packet units, and extracts a service block within the packet packets to manage a caption service (step 468).

The process of displaying the extracted closed caption information on the screen is similar to that described above with reference to FIGS. 13 through 23. Namely, assuming that the caption bitmap for the base view, e.g., the left image, is similar to that shown in FIG. 14, the caption bitmap for the extended view shown in FIG. 16 may be constructed by shifting the caption bitmap for the base view by the horizontal disparity as shown in FIG. 15. The first mixer 220 combines the left caption OSD signal to the left signal, and the second mixer 222 combines the right caption OSD signal to the right image signal. The formatter 224 formats the two image signals according to the stereoscopic scheme, so that the formatted image signals are output through the display panel 226. The left and right images superimposed with respective closed caption windows may be synthesized according to the horizontal or vertical interleaving scheme as shown in FIG. 18 or FIG. 19, respectively, or may be synthesized into the checkerboard pattern as shown in FIG. 20.

Figure 29:
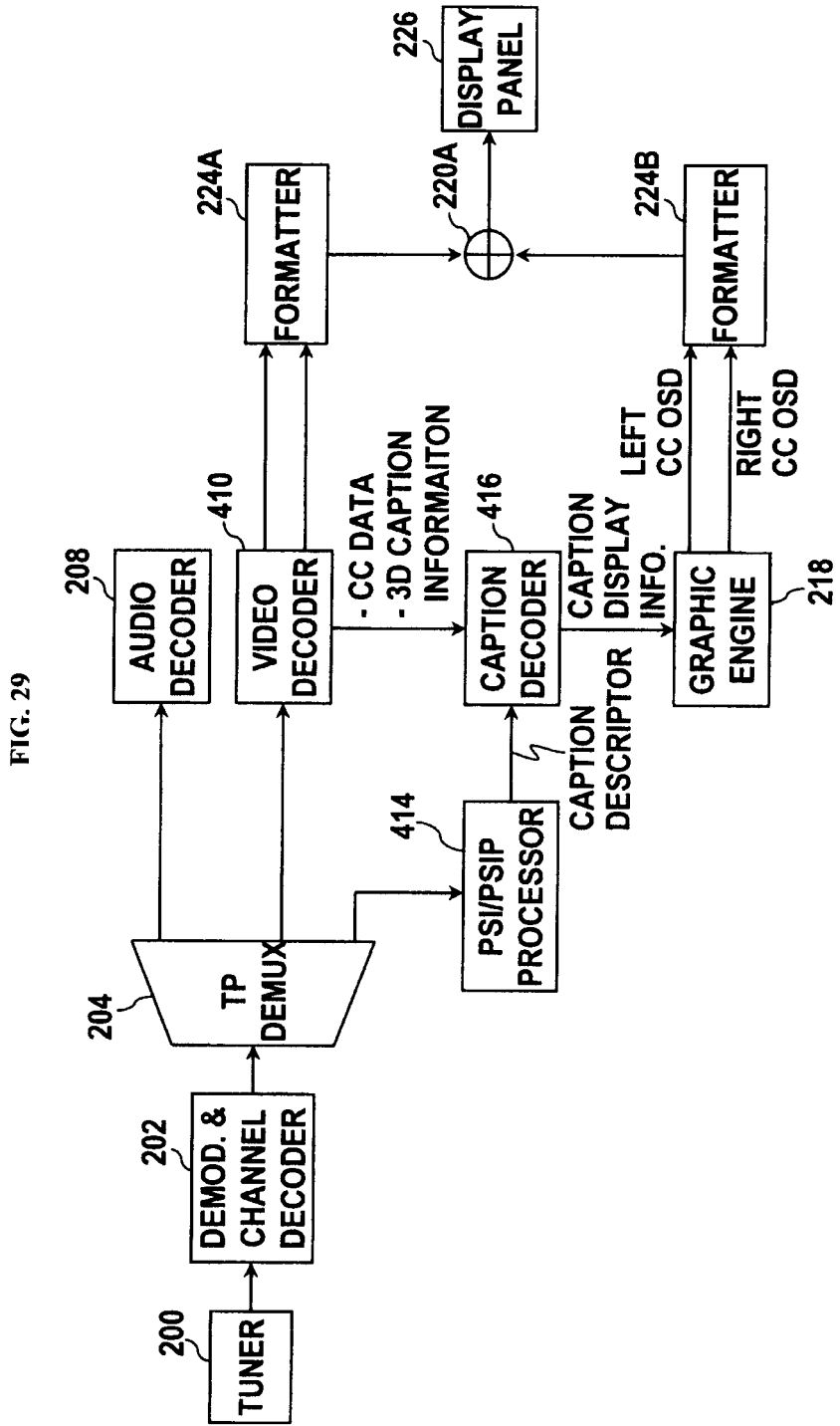
FIG. 29 is a schematic block diagram of an alternative embodiment of the television receiver of FIG. 27.

FIG. 29 is a schematic block diagram of an alternative embodiment of the television receiver of FIG. 27. According to the present embodiment, the left and right broadcast image signals are formatted by one formatter, and left and right closed caption OSD signals are formatted by another formatter, and then the formatted signals are mixed. The first formatter 224A formats the left and right image signals from the video decoder 410 according to a stereoscopic output scheme. The second formatter 224B formats the left and right image caption OSD signals from the graphic engine 218 according to the stereoscopic output scheme. The mixer 220A synthesizes output signals of the first and second formatters 224A and 224B, so that the formatted image signals are displayed on the display panel 226.

Assuming that the caption bitmaps for the left and right images are the same as those shown in FIGS. 14 and 16, respectively, the second formatter 224B outputs a caption bitmap image formatted in the side-by-side format shown in FIG. 22 or the top-down format shown in FIG. 23. Accordingly, the stereoscopic 3D image displayed on the display panel 226 after being mixed by the mixer 220A may have a form similar to that shown in FIG. 18 or FIG. 19. Other features of the television receiver illustrated in FIG. 29 are similar to those of the embodiment of FIG. 27, and thus a detailed description thereof will be omitted.

Third Embodiment

Figure 30:
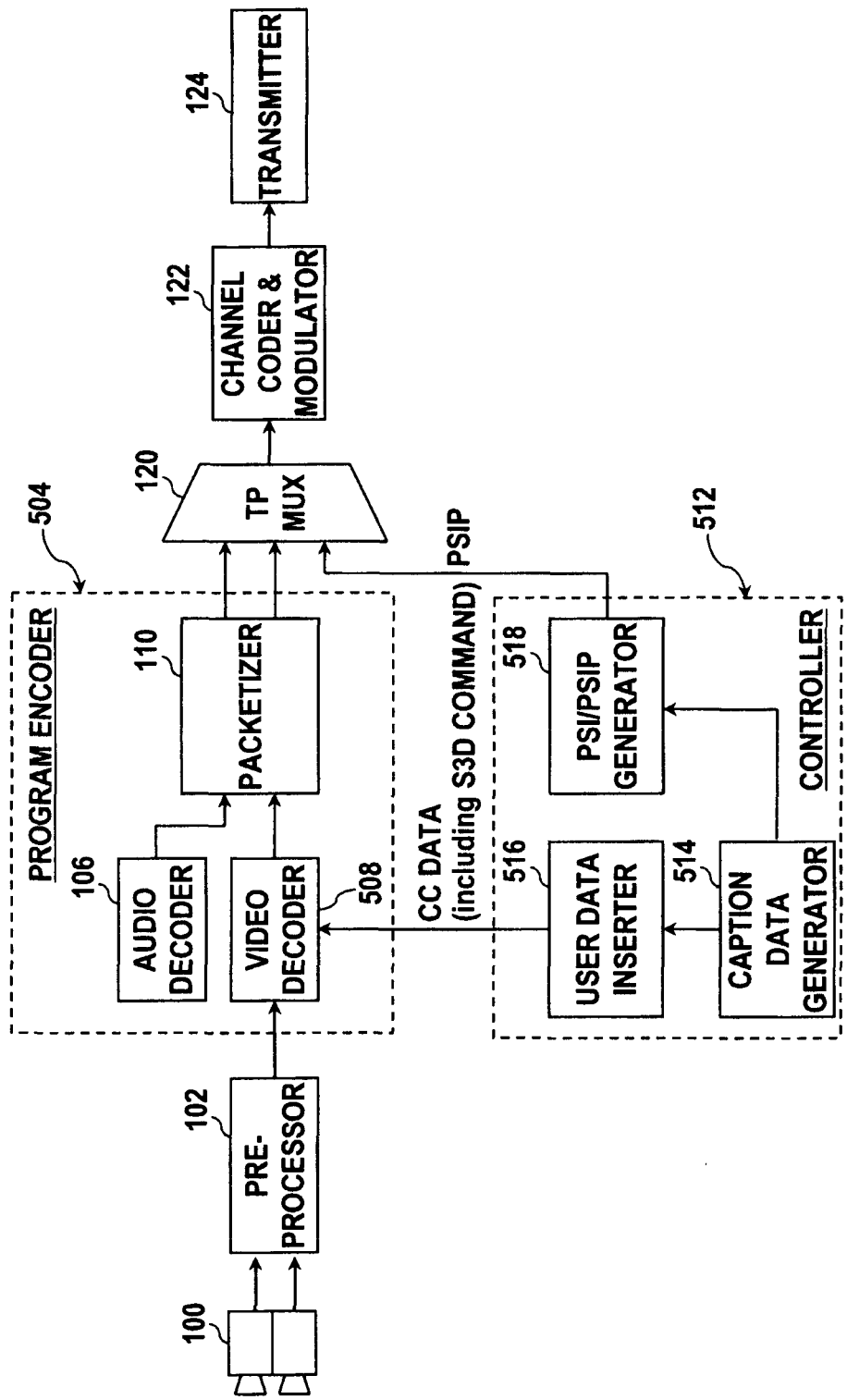
FIG. 30 is a schematic block diagram of a broadcasting system according to a third exemplary embodiment of the present invention.

FIG. 30 illustrates a broadcasting system according to a third exemplary embodiment of the present invention. In the third exemplary embodiment, 3D caption information is inserted as a caption control code into the close caption data cc_data( ).

In the system of FIG. 30, a video encoder 508 receives user data from a user data inserter 516 to insert into a picture header while encoding video signals. Particularly, the user data includes closed caption data cc_data( ), which then includes 3D caption information for supporting the 3D caption.

A caption data generator 514 receives time-stamped caption data through a network or by a recording medium from an external workstation, and generates a caption channel packet shown in FIG. 3. The caption data generator 314 provides the caption channel packet and the 3D caption information to the user data inserter 316, so that the user data inserter 316 inserts these information into the picture user data. In particular, in the present exemplary embodiment, the 3D caption information is inserted as a control code into caption packet data of the caption channel packet as described below. In addition, the caption data generator 314 provides caption service information indicating a type and attributes of a caption service to a PSI/PSIP generator 518 so that the PSI/PSIP generator 518 can generate a caption service descriptor.

The user data inserter 516 provides the video encoder 508 with extension data and user data to be inserted at a sequence level, a GOP level, or a picture level during the encoding process. In particular, the user data inserter 516 provides a video encoder 508 with the caption channel packet from the caption data generator 514 as a sort of user data, so that the video encoder 508 can insert the caption channel packets by two bytes at a time into the picture header while encoding the video signal.

As mentioned above, when the caption data cc_data( ) is encoded according to a code space of FIG. 5 before a service block header and a caption header are added, the 3D caption information for supporting the 3D caption is inserted into the caption data cc_data( ) through a control code. FIG. 31 illustrates an example of a coding format of a Set 3D parameter (S3D) command for delivering the 3D caption information. In a preferred exemplary embodiment, the Set 3D parameter command includes three bytes: one byte command code and two bytes of parameters, and can be abbreviated by "S3D" in the code space.

In the drawing, "3D_Type_Flag" field indicates whether or not a parameter for supporting the 3D caption is included, and a type of the parameter. The "3D_Type_Flag" value of '00' indicates that the 3D caption is not supported and the parameters following this field should be discarded. The "3D_Type_Flag" value of '01' indicates that the 3D caption is supported and a "Disparity Parameter" field denotes a horizontal disparity value expressed in the pixel units. The "3D_Type_Flag" value of '10' indicates that the 3D caption is supported and the "Disparity Parameter" field denotes a horizontal disparity value represented as a ratio (%) with respect to the width of a display. The "3D_Type_Flag" value of '11' indicates that the 3D caption is supported and the "Disparity Parameter" field is a caption depth value.

"Base_View" field defines a base view which serves as a reference of the stereoscopic image pair, i.e., the left and right images. In the present exemplary embodiment, the left view is the base view if the "base_view" field is 0, and the right view is the base view if the "base_view" field is 1.

When the "3D_Type_Flag" field has a value of '01' or '10', the "Disparity Parameter" field is a horizontal disparity value between the base view and the extended view at a caption display position, and denotes a caption display position for the extended view with respect to the caption display position for the base view. Thus, the receiver can obtain the closed caption display position for the extended view by shifting the closed caption for the base view by the horizontal disparity value. As mentioned above, the data format of the "Disparity Parameter" field may be indicated by the "3D_Type_Flag" field. In the above description, the horizontal disparity value denoted by the "3D_Type_Flag" field can be expressed by the number of pixels or a ratio (%) with respect to the width of the display. Alternatively, however, the "3D_Type_Flag" may be expressed by physical length (e.g., centimeters, inches, etc.) as well. When the horizontal disparity value is intended to be expressed by the physical length, the "3D_Type_Flag" field may be defined to substitute either the pixel numbers or the ratio to the display width, or a certain field may be newly defined besides the "3D_Type_Flag" field. In addition, the "3D_Type_Flag" field value of '00' may define that the "Disparity Parameter" denotes a horizontal disparity value expressed by the pixel numbers.

When the "3D_Type_Flag" field has a value of '11', the "Disparity Parameter" field denotes the depth of the caption in the stereoscopic 3D image. When the 3D video data includes depth information, the depth data for the caption data can be provided to the receiver instead of the horizontal disparity, so that the receiver can determine the caption display position in the 3D images by applying the depth data. Preferably, the size and scale of the depth is equal to depth information regarding video data so that the receiver can interpret it in the same manner. Even though the depth value for the video data may have a negative or positive value, a depth map which maps the depth value into a value of [0.255] may be constructed. Preferably, the depth value for the caption is expressed in this manner. Meanwhile, in constructing the depth map, the depth value may be mapped into the value of [0.255] in a linear scale. Alternatively, however, the depth value may also be mapped, for example, in a logarithmic scale in consideration of the perception characteristics of human beings.

FIG. 32 illustrates the position of the Set 3D parameter (S3D) command in a code space according to an exemplary embodiment of the present invention. In the code space compliant with the CEA-708-B standard of FIG. 5, C0 code set is allocated to map various control codes, and includes 32 codes from "0x00" to "0x1F." In the C0 code set, the codes "0x00" through "0x0F" are single byte codes, and the codes "0x10" through "0x17" are two byte codes, and the codes "0x18" through "0x1F" are three byte codes.

In the embodiment described above, the Set 3D parameter command is a three byte code, and can be mapped into one of empty codes among the codes "0x18" through "0x1F." Preferably, the Set 3D parameter command is mapped into the position of "0x18."

Figure 4:
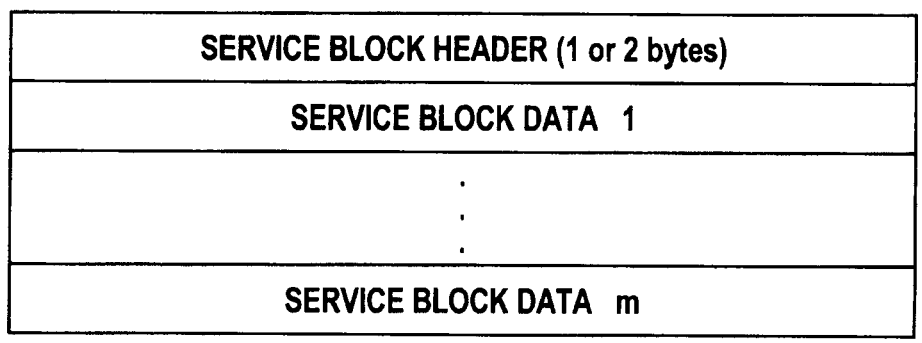
FIG. 4 shows the structure of a service block compliant with CEA-708-B standard.

The Set 3D parameter command defined as above constitutes service block data along with another control codes and caption text data. The service block data prefixed by a service block header forms a service block as shown in FIG. 4, and the service block prefixed by a packet header constitutes a caption channel packet as shown in FIG. 3. The caption channel packet is divided in two byte units and inserted into the picture header of the video ES.

Caption service information describing the type and attributes of a caption service carried by the picture user data is transmitted to the receiver separately from the caption data. In the present exemplary embodiment, the caption service information is generated according to the ATSC A/65 standard, included in a caption service descriptor, and transmitted through an Event Information Table (EIT) of an MPEG-2 transport stream. The syntax of the caption service descriptor according to the present exemplary embodiment follows the general format shown in FIG. 26.

Figure 33:
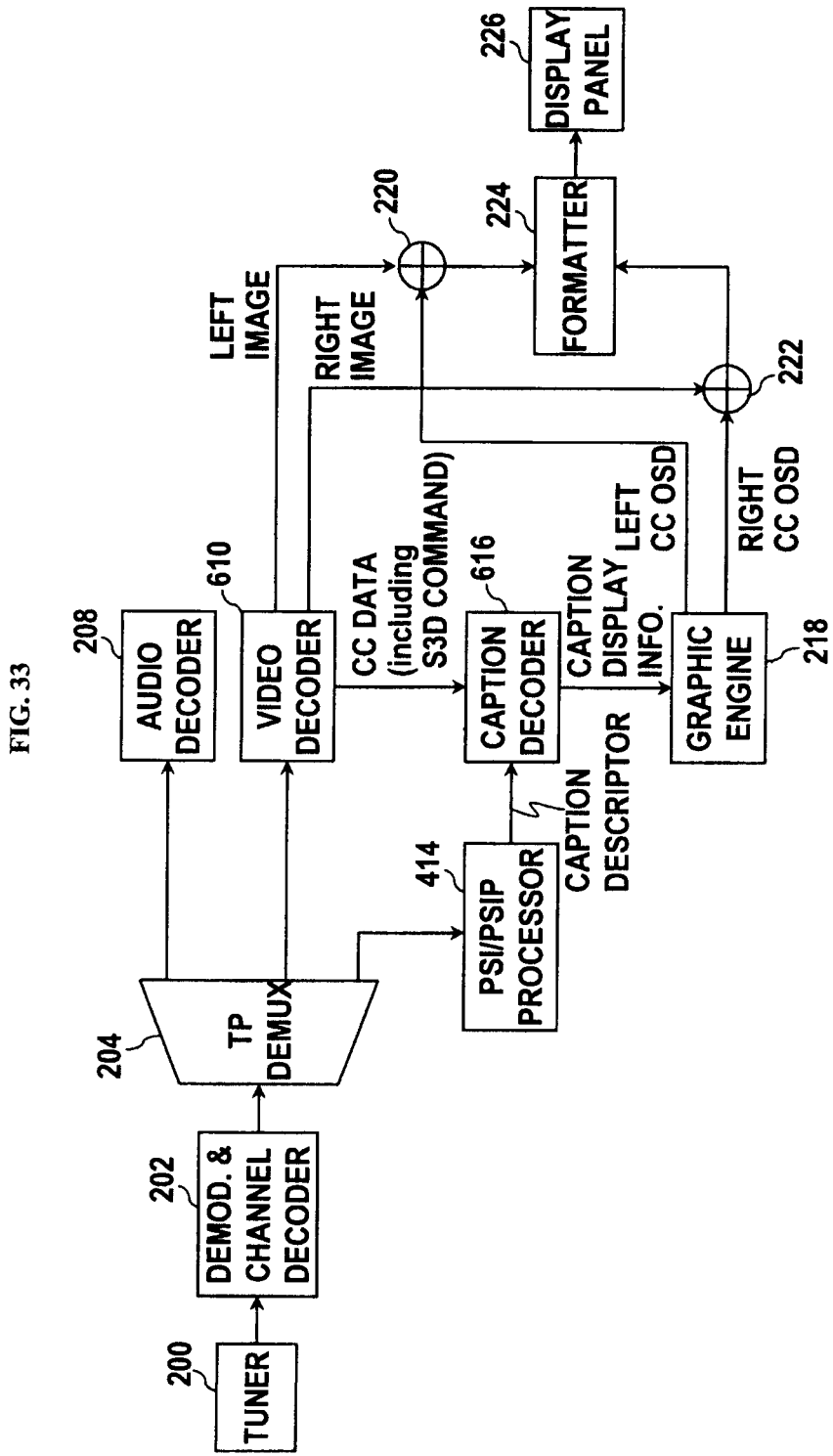
FIG. 33 is a schematic block diagram of a television receiver according to a third exemplary embodiment of the present invention.

FIG. 33 is a schematic block diagram of a television receiver suitable for receiving the broadcast signal transmitted by the system of FIG. 30.

The tuner 200 selects a broadcast signal of a certain channel selected by the user among a plurality of broadcast signals inputted through an antenna. The demodulation and channel decoding unit 202 demodulates the broadcast signal from the tuner 200, and performs error-correction-decoding on the demodulated signal to output the Transport Stream (TS). The transport demutiplexer 204 demultiplexes the TS to separate a video ES and an audio ES and extract PSI/PSIP information.

The audio decoder 208 decodes the audio ES to output a digital audio bit stream. The audio bit stream is converted into an analog audio signal by the digital-to-analog converter, amplified by the amplifier, and then outputted through the speaker. A video decoder 610 parses the video ES to extract extension and user data and MPEG-2 video bit stream. The video decoder 610 extracts closed caption data cc_data( ) from the extension and user data and to output to the caption decoder 216. The video decoder 610 decodes the MPEG-2 video bit stream to output left and right video signals for implementing stereoscopic 3D image pair. The decoding process performed by the audio decoder 208 and the video decoder 610 may be carried out based on the packet ID (PID) detected by the PSI/PSIP processor 214.

The PSI/PSIP processor 414 receives and parses the PSI/PSIP information from the transport demultiplexer 204 to store in the memory or the register, so that the broadcast images are reproduced based on the stored information. The EIT of the PSIP includes a caption service descriptor which contains the caption service information describing the type and attributes of a caption service. The PSI/PSIP processor 214 provides the caption service information to a caption decoder 616, so that the caption decoder 616 can decode caption data based on the received caption service information.

The caption decoder 616 receives the closed caption data cc_data( ) from the video decoder 610 and accumulates the closed caption data pairs carried by the "cc_data_1" and "cc_data_2" fields. In addition, the caption decoder 616 depacketizes the caption packet data based on the caption service information from the PSI/PSIP processor 414 to restore service block data for each service. And then, the caption decoder 616 decodes and interprets the service block data. When the Set 3D parameter command is detected in the process of interpreting the service block data, the caption decoder 616 detects base view information as well as the 3D caption information parameter, i.e., the horizontal disparity value or the depth value from the command. The caption decoder 616 generates caption display information based on the interpreted service block data and the 3D caption parameter to provide the graphic engine 218.

The graphic engine 218 receives the caption display information from the caption decoder 416 and generates caption bitmaps for the base view and the extended view in OSD signal form based on the caption display information. Here, the base view may be the left image and the extended view may be the right image. First, the graphic engine 218 constructs the caption bitmap for the base view using the base view information determined by the "Base_View" field and the extracted closed caption data, and outputs the caption bitmap for the left image in the OSD signal form. Subsequently, the graphic engine 218 constructs the caption bitmap for the extended view using the 3D caption parameter, and outputs the caption bitmap for the right image in the OSD signal form. When the 3D caption parameter is the horizontal disparity value, the caption bitmap for the extended view can be constructed by shifting the caption bitmap for the base view by the horizontal disparity. Meanwhile, if the 3D caption parameter is the depth value, caption data corresponding to the base view is displayed on the display by use of the caption depth value, which is especially useful when depth image is additionally provided in the broadcast signal.

The first mixer 220 mixes the left image caption bitmap from the graphic engine 218 to the left image signal from the video decoder 610. The second mixer 222 mixes the right image caption bitmap from the graphic engine 218 to the right image signal from the video decoder 610. The formatter 224 formats the left and right images superimposed with respective caption bitmaps while comparing a frame time of the image signals, such that temporarily coincident left and right images can be displayed as a pair on the display panel 232. The formatted 3D image signal is reconstructed into a 3D image on the display panel 226.

Figure 34:
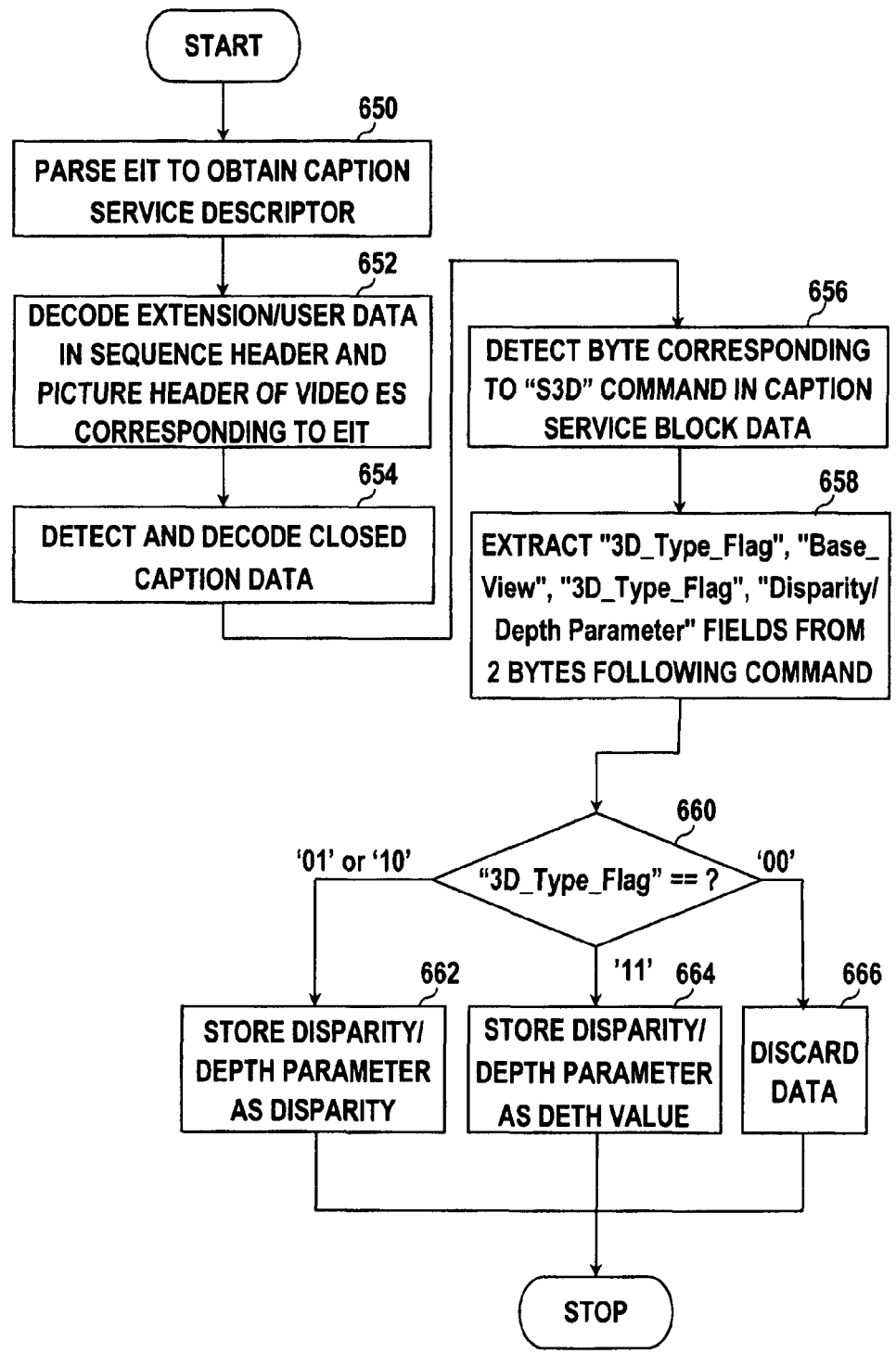
FIG. 34 is a flow chart illustrating the process of extracting closed caption information in the television receiver of FIG. 33.

The process of extracting closed caption information in the television receiver illustrated in FIG. 33 will now be described in detail with reference to FIG. 34.

First, the PSI/PSIP processor 414 parses the PSIP to extract a Master Guide Table (MGT) of which "PID" is '0x1FFB' and "table_ID" is '0xC7' based on a packet ID (PID) and a table ID, and obtains PID information regarding an Event Information Table (EIT) from the MGT. Next, the PSI/PSIP processor 414 reads a TP having the acquired PID to extract an EIT of which "table_ID" is '0xC7'. And then, the PSI/PSIP processor 414 parses the EIT and detects the caption service descriptor shown in FIG. 26 for each event in the EIT as well as and caption service information (step 650).

In step 652, the video decoder 610 parses the video ES corresponding to the EIT to output extension and user data and an MPEG-2 video bit stream, and decodes the MPEG-2 video bit stream. During the process of parsing the video ES, the video decoder 610 decodes extension_and_user_data(2) in the picture header to extract picture user data user_data( ) after extracting the header and the extension and user data. Meanwhile, in an alternative embodiment where the video ES is encoded according to the H.264/AVC standard, a Supplemental Enhancement Information (SEI) is decoded at this stage. Namely, the video decoder 610 parses an AVC NAL unit to extract the SEI data having an "nal_unit_type" value of '6' and reads user_data_registered_itu_t_t35( ) message having "payloadType" value of '4'.

Subsequently, the video decoder 610 detects ATSC_user_data( ) having "user_data_identifier" value of '0x47413934' from the picture user data user_data( ), and extracts user_data_type_structure( ) having "user_data_type_code" of '0x03' from the ATSC_user_data( ) as the closed caption data cc_data( ). Subsequently, the caption decoder 616 accumulates the caption data byte pairs (cc_data1 and cc_data2) received through cc_data( ) in packet units, and extracts a service block within the packet packets to manage a caption service (step 654).

Thereafter, the caption decoder 616 detects a data byte corresponding to the Set 3D parameter command from the accumulated caption service block data (step 656). The caption decoder 616 extracts "3D_Type_Flag", "Base_View", "3D_Type_Flag", and "Disparity/Depth Parameter" fields from two parameter bytes following the detected command byte (step 658).

In step 660, the caption decoder 616 determines whether a close caption should be displayed in 3D based on the "3D_Type_Flag" field. If the "3D_Type_Flag" field has a value of '01', '10', or '11' to indicate the 3D caption, the caption decoder 616 extracts a 3D caption-related parameters from the Set 3D parameter command and stores it in the memory. In more detail, when the "3D_Type_Flag" field has a value of '01' or '10', the caption decoder 616 stores the "Disparity/Depth Parameter" as a horizontal disparity value (step 662). If the "3D_Type_Flag" field has a value of '11', the caption decoder 616 stores the "Disparity/Depth Parameter" as a caption depth value (step 664). Meanwhile, if the "3D_Type_Flag" field has a value of '00', the caption decoder 616 regards that the corresponding program does not support the 3D caption function, and discards the parameter data within the Set 3D parameter command (step 666).

The process of displaying the extracted closed caption information on the screen is similar to that described above with reference to FIGS. 13 to 23. Namely, assuming that the caption bitmap for the base view, e.g., the left image, is similar to that shown in FIG. 14, the caption bitmap for the extended view shown in FIG. 16 may be constructed by shifting the caption bitmap for the base view by the horizontal disparity as shown in FIG. 15. The first mixer 220 combines the left caption OSD signal to the left signal, and the second mixer 222 combines the right caption OSD signal to the right image signal. The formatter 224 formats the two image signals according to the stereoscopic scheme, so that the formatted image signals are output through the display panel 226. The left and right images superimposed with respective closed caption windows may be synthesized according to the horizontal or vertical interleaving scheme as shown in FIG. 18 or FIG. 19, respectively, or may be synthesized into the checkerboard pattern as shown in FIG. 20.

Figure 35:
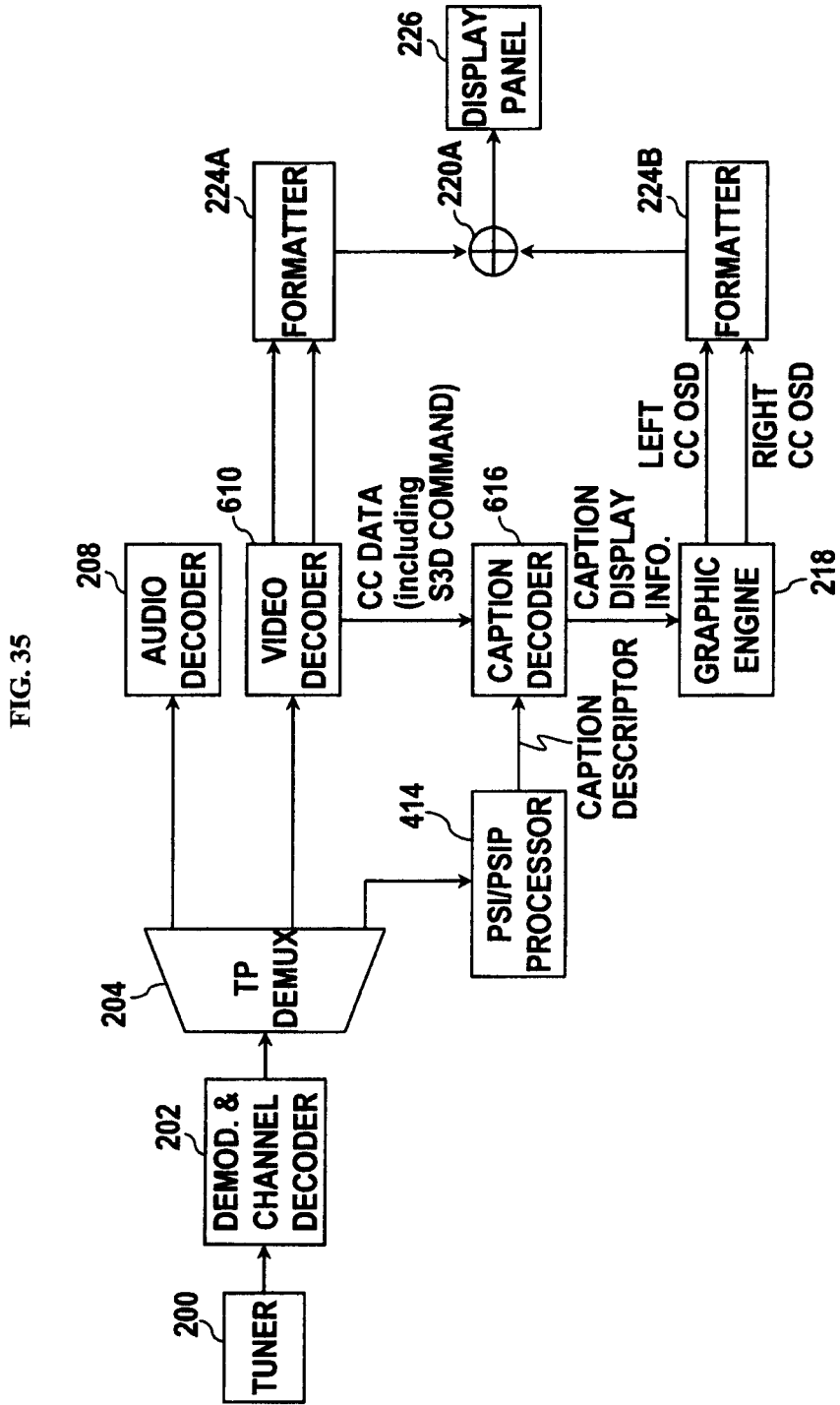
FIG. 35 is a schematic block diagram of an alternative embodiment of the television receiver of FIG. 33.

FIG. 35 is a schematic block diagram of an alternative embodiment of the television receiver of FIG. 33. According to the present embodiment, the left and right broadcast image signals are formatted by one formatter, and left and right closed caption OSD signals are formatted by another formatter, and then the formatted signals are mixed. The first formatter 224A formats the left and right image signals from the video decoder 410 according to a stereoscopic output scheme. The second formatter 224B formats the left and right image caption OSD signals from the graphic engine 218 according to the stereoscopic output scheme. A mixer 220A synthesizes output signals of the first and second formatters 224A and 224B, so that the formatted image signals are displayed on the display panel 226.

Assuming that the caption bitmaps for the left and right images are the same as those shown in FIGS. 14 and 16, respectively, the second formatter 224B outputs a caption bitmap image formatted in the side-by-side format shown in FIG. 22 or the top-down format shown in FIG. 23. Accordingly, the stereoscopic 3D image displayed on the display panel 226 after being mixed by the mixer 220A may have a form similar to that shown in FIG. 18 or FIG. 19. Other features of the television receiver illustrated in FIG. 35 are similar to those of the embodiment of FIG. 33, and thus a detailed description thereof will be omitted.

Even though the "Disparity Parameter" field consists of one byte data according to the coding format of FIG. 31, the Disparity Parameter may comprise two or more bytes alternatively so as to enhance precision of data or extend display range. FIG. 36 shows such an example. In the example of FIG. 36, the Set 3D parameter command includes four bytes: one byte command code and three bytes of parameters. Here, the "Disparity Parameter" field has two bytes and is expressed by one upper byte and one lower byte.

FIG. 37 illustrates the position of the Set 3D parameter command in the code space according to an exemplary embodiment of FIG. 36. In the code space according to the CEA-708-B standard shown in FIG. 5, caption control codes are concentrated in the C1 code set. If an additional command is required besides the code set, reserved codes in C2 or C3 code set are available. C2 code set includes 32 codes from "0x00" to "0x1F", and may be addressed by prefixing "0x10" (i.e., 'EXT1' code). Among the codes in the C2 code set, codes from "0x00" to "0x07" are single byte codes (requiring no additional byte), codes from "0x08" to "0x0F" are two byte codes (requiring one additional byte), codes from "0x10" to "0x17" are three byte codes (requiring two additional bytes), and codes from "0x18" to "0x1F" are four byte codes (requiring three additional bytes). In the exemplary embodiment of FIG. 36, the Set 3D parameter (S3D) command consists of four bytes excluding the prefix, the 'EXT1', and thus can be mapped into one of the codes from "0x18" to "0x1F." Preferably, the Set 3D parameter (S3D) command is mapped into the code "0x18."

Other Alternatives

Besides, various changes and modifications may be made to the described embodiments without departing from the spirit and scope of the present invention.

For example, even though the caption service descriptor is included in the Event Information Table (EIT) in the exemplary embodiments of FIGS. 6 to 23, the descriptor may be inserted into a Program Mapping Table (PMT) or the other table, alternatively.

Meanwhile, in the above description, the 3D caption parameter, e.g., the horizontal disparity value or the caption depth value, is transmitted to the receiver through broadcast signal. However, the horizontal disparity value may be synthesized in the receiver. For example, the television receiver may apply a block matching algorithm for the left and right images to calculate horizontal disparity values with respect to a plurality of blocks or objects. Generally, an object having a positive horizontal disparity of larger absolute value is recognized to be positioned farther from the viewer, and another object having a negative horizontal disparity of larger absolute value is recognized to be positioned nearer to the viewer. Therefore, a horizontal disparity value for the closed caption can be determined based on a horizontal disparity value calculated for an object presumed to be positioned nearest to the viewer.

If the screen has a large size and the horizontal disparity value between the closed captions for the left and right images is large, there may be a difference between the width of the closed caption for the left image and the width of the closed caption for the right image. Thus, in consideration of this, the graphic engine may additionally perform scaling in order to adjust the width of one or both of the closed captions for the left and right images.

Thus, it should be understood that the forgoing description is illustrative and nor restrictive. We claim all modifications and variation coming within the spirit and scope of the following claims.

INDUSTRIAL APPLICABILITY

As so far described, closed caption can naturally be merged with 3D image and displayed according to the 3D display apparatus of the present invention. In particular, even when closed caption data is provided only a single image rather than all of a plurality of 2D images for implementing a 3D image, the receiver can display the 3D caption based on the 3D caption information.

The present invention can be applicable to any kinds of display apparatuses that have 3D display capability and need to have closed caption display function. In particular, the present invention can be particularly useful for a stereoscopic display apparatus regardless of formatting scheme such as dual mode display, a time sequential display, or the like.

We claim:

1. A method for displaying a three-dimensional (3D) caption in a 3D display apparatus, the method comprising:
   receiving a broadcast signal including 3D caption data based on a code space, wherein the code space contains base code sets and extended code sets;
   acquiring 3D command and caption text from the 3D caption data,
   wherein the 3D command is delivered in at least one extended code set, and
   wherein the 3D command specifies an amount of horizontal offset between left-and right-eye views for a caption window; and
   processing the 3D command and the caption text such that the caption text is written to the caption window for 3D captioning.

2. The method of claim 1, wherein the at least one extended code set is accessed by using an 'EXT1' code in a base code set.

3. The method of claim 1, wherein caption disparity data transported in the 3D command is applied to the caption window.

4. The method of claim 1, wherein the caption data is formatted within picture user data, and wherein the picture user data is inserted at any of Sequence level, Group of Pictures (GOP) level, and Picture Data level.

5. The method of claim 1, wherein the 3D command is accessed by using the 'EXT1' code in the base code set.

6. The method of claim 1, wherein the 3D command is delivered in a C3 code set contained in the code space.

7. The method of claim 1, wherein the code space is defined in CEA-708 standard.

8. The method of claim 1, wherein the caption text is three-dimensionally displayed within the caption window.

9. A three-dimensional (3D) display apparatus comprising:
   a signal receiving unit for receiving a broadcast signal including 3D caption data based on a code space, wherein the code space contains base code sets and extended code sets;
   a caption decoding unit for decoding the caption data to acquiring 3D command and caption text from the 3D caption data,
   wherein the 3D command is delivered in at least one extended code set, and
   wherein the 3D command specifies an amount of horizontal offset between left-and right-eye views for a caption window; and
   a processing unit for processing the 3D command and the caption text such that the caption text is written to the caption window for 3D captioning.

10. The apparatus of claim 9, wherein the at least one extended code set is accessed by using an 'EXT1' code in a base code set.

11. The apparatus of claim 9, wherein caption disparity data transported in the 3D command is applied to the caption window.

12. The apparatus of claim 9, wherein the caption data is formatted within picture user data, and wherein the picture user data is inserted at any of Sequence level, Group of Pictures (GOP) level, and Picture Data level.

13. The apparatus of claim 9, wherein the 3D command is accessed by using the 'EXT1' code in the base code set.

14. The apparatus of claim 9, wherein the 3D command is delivered in a C3 code set contained in the code space.

15. The apparatus of claim 9, wherein the code space is defined in CEA-708 standard.

16. The apparatus of claim 9, wherein the caption text is three-dimensionally displayed within the caption window.

17. A method for transmitting a three dimensional (3D) caption signal, the method comprising:
   encoding a broadcast signal including 3D caption data based on a code space, wherein the code space contains base code sets and extended code sets;
   wherein the 3D caption data includes 3D command and caption text,
   wherein the 3D command is delivered in at least one extended code set,
   wherein the 3D command specifies an amount of horizontal offset between left-and right-eye views for a caption window; and
   transmitting, to a receiver, the caption data that includes the 3D command and the caption text,
   wherein the 3D command and the caption text are processed such that the caption text is written to the caption window for 3D captioning.

18. An apparatus for transmitting three dimensional (3D) caption, the apparatus comprising:
   means adapted for encoding a broadcast signal including 3D caption data based on a code space, wherein the code space contains base code sets and extended code sets;
   wherein the 3D caption data includes 3D command and caption text,
   wherein the 3D command is delivered in at least one extended code set, and
   wherein the 3D command specifies an amount of horizontal offset between left-and right-eye views for a caption window; and
   means adapted for transmitting, to a receiver, the caption data that includes the 3D command and the caption text,
   wherein the 3D command and the caption text are processed such that the caption text is written to the caption window for 3D captioning.
   transmitting, to a receiver, the caption data that includes the 3D command and the caption text,
   wherein the 3D command and the caption text are processed such that the caption text is written to the caption window for 3D captioning.

* * * * *